(12) United States Patent
Nakamura

(10) Patent No.: US 10,298,892 B2
(45) Date of Patent: May 21, 2019

(54) IMAGE PROJECTING SYSTEM, INFORMATION PROCESSING APPARATUS, AND METHOD FOR IMAGE PROJECTING

(71) Applicant: Kazuaki Nakamura, Kanagawa (JP)

(72) Inventor: Kazuaki Nakamura, Kanagawa (JP)

(73) Assignee: Ricoh Company, Ltd., Tokyo (JP)

(\*) Notice: Subject to any disclaimer, the term of this patent is extended or adjusted under 35 U.S.C. 154(b) by 0 days.

(21) Appl. No.: 15/692,004

(22) Filed: Aug. 31, 2017

(65) Prior Publication Data

US 2018/0063491 A1 Mar. 1, 2018

(30) Foreign Application Priority Data

Aug. 31, 2016 (JP) ................................. 2016-169182

(51) Int. Cl.
| | |
|---|---|
| *H04N 5/74* | (2006.01) |
| *H04N 9/28* | (2006.01) |
| *H04N 9/31* | (2006.01) |
| *G03B 17/54* | (2006.01) |
| *G03B 21/13* | (2006.01) |
| *G03B 21/14* | (2006.01) |
| *G03B 21/53* | (2006.01) |
| *G03B 21/56* | (2006.01) |

(52) U.S. Cl.
CPC ............. *H04N 9/317* (2013.01); *G03B 17/54* (2013.01); *G03B 21/13* (2013.01); *G03B 21/147* (2013.01); *G03B 21/53* (2013.01); *G03B 21/56* (2013.01); *H04N 5/7416* (2013.01); *H04N 9/28* (2013.01); *H04N 9/3105* (2013.01); *H04N 9/3147* (2013.01); *H04N 9/3185* (2013.01); *H04N 9/3194* (2013.01)

(58) Field of Classification Search
CPC .... H04N 9/317; H04N 5/7416; H04N 9/3185; H04N 9/28; H04N 9/3105; G03B 21/53; G03B 21/147; G03B 17/54
See application file for complete search history.

(56) References Cited

U.S. PATENT DOCUMENTS

| | | | |
|---|---|---|---|
| 2002/0027608 A1* | 3/2002 | Johnson | ................... H04N 9/12 348/383 |
| 2005/0206857 A1* | 9/2005 | Yamada | ................. G03B 21/56 353/94 |

(Continued)

*Primary Examiner* — Nitin Patel
*Assistant Examiner* — Amy Onyekaba
(74) *Attorney, Agent, or Firm* — Oblon, McClelland, Maier & Neustadt, L.L.P.

(57) ABSTRACT

An image projection apparatus includes processing circuitry that receives, for each surface of a plurality of surfaces in a projection region, an adjustment value to increase or decrease an effective distance from an imaging device to a curved position of the surface. The processing circuitry further determines, for each surface, a curved shape of the surface in accordance with a change of distortion corresponding to the effective distance that was increased or decreased by the received adjustment value. The processing circuitry further calculates, for each surface, correction parameters to correct the distortion of projection images projected onto the surface, in accordance with the determined curved shape of the surface. The processing circuitry further divides an image into a plurality of divided images in accordance with positions and sizes of the each surface of the plurality of surfaces in the projection region.

7 Claims, 29 Drawing Sheets

(56) References Cited

U.S. PATENT DOCUMENTS

| | | | | |
|---|---|---|---|---|
| 2006/0152680 A1* | 7/2006 | Shibano | .............. | G03B 37/04 |
| | | | | 353/30 |
| 2007/0008503 A1* | 1/2007 | Choi | .............. | G03B 21/28 |
| | | | | 353/98 |
| 2007/0242233 A1* | 10/2007 | Sokeila | .............. | G03B 21/26 |
| | | | | 353/69 |
| 2008/0129894 A1* | 6/2008 | Kang | .............. | H04N 9/3147 |
| | | | | 348/758 |
| 2008/0136976 A1* | 6/2008 | Ajito | .............. | G03B 21/56 |
| | | | | 348/745 |
| 2009/0207185 A1* | 8/2009 | Furui | .............. | H04N 9/3185 |
| | | | | 345/619 |
| 2011/0050873 A1* | 3/2011 | Nelson | .............. | H04N 9/3185 |
| | | | | 348/61 |
| 2011/0210979 A1* | 9/2011 | Furui | .............. | H04N 9/3147 |
| | | | | 345/619 |
| 2011/0255057 A1* | 10/2011 | Becouarn | .............. | G02B 27/01 |
| | | | | 353/31 |
| 2015/0077573 A1* | 3/2015 | Ishikawa | .............. | G06T 3/005 |
| | | | | 348/189 |
| 2015/0237317 A1* | 8/2015 | Ehara | .............. | H04N 9/3185 |
| | | | | 348/745 |
| 2016/0261831 A1* | 9/2016 | Coleman | .............. | H04N 9/3147 |
| 2016/0269702 A1* | 9/2016 | Konno | .............. | H04N 9/3182 |
| 2016/0295184 A1* | 10/2016 | Ishikawa | .............. | H04N 9/3185 |
| 2016/0353068 A1* | 12/2016 | Ishikawa | .............. | H04N 9/3147 |
| 2017/0118451 A1 | 4/2017 | Sakai | | |
| 2017/0154452 A1 | 6/2017 | Ishizu et al. | | |
| 2017/0208309 A1* | 7/2017 | Oike | .............. | H04N 9/3147 |
| 2017/0329208 A1* | 11/2017 | Takahashi | .............. | G09G 5/00 |

\* cited by examiner

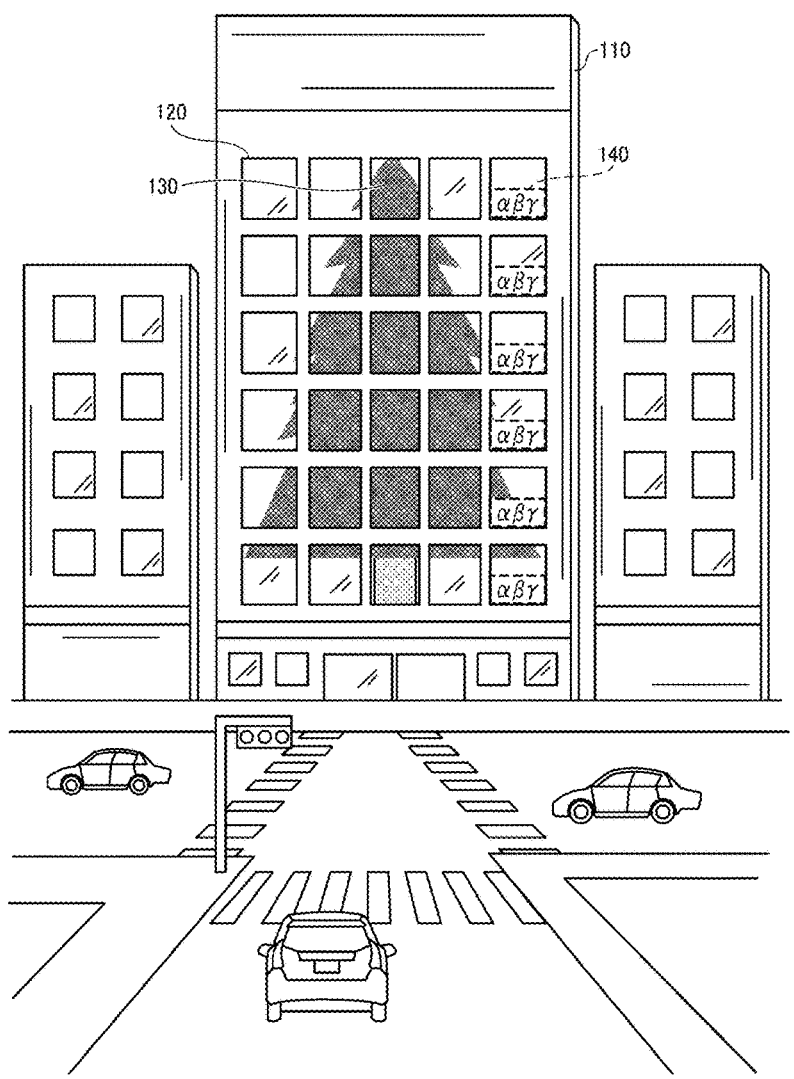

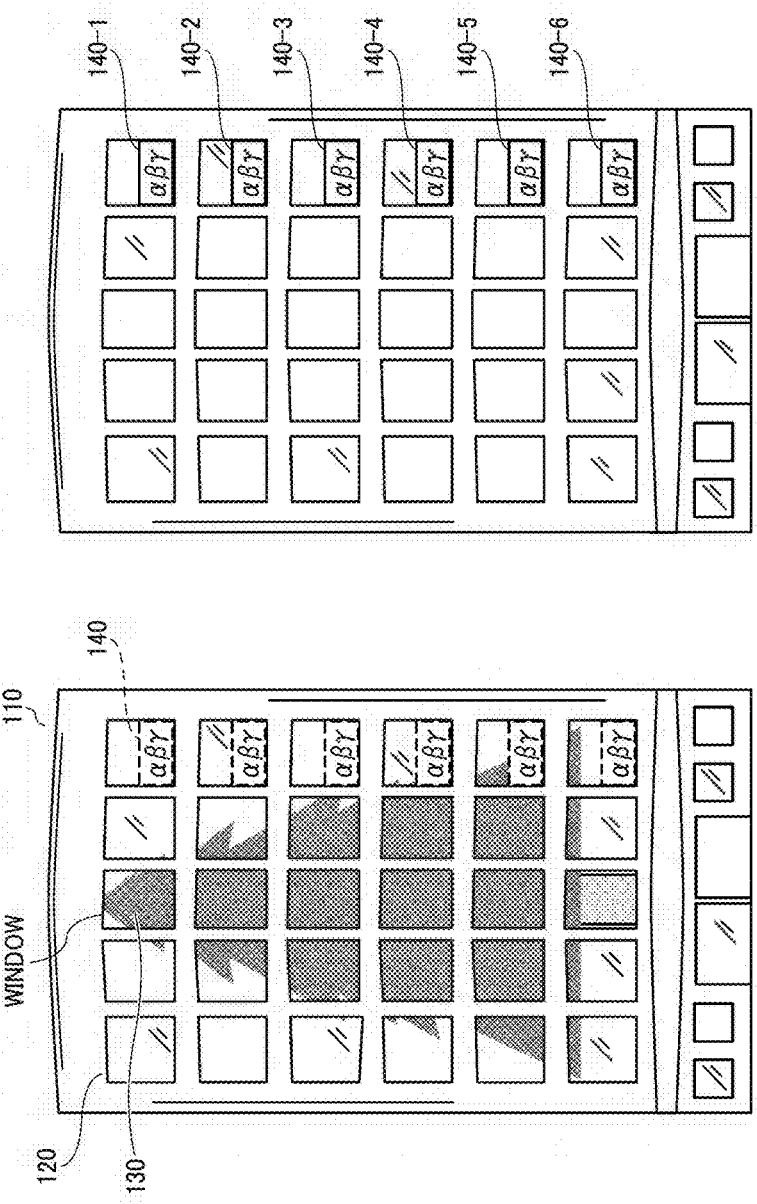

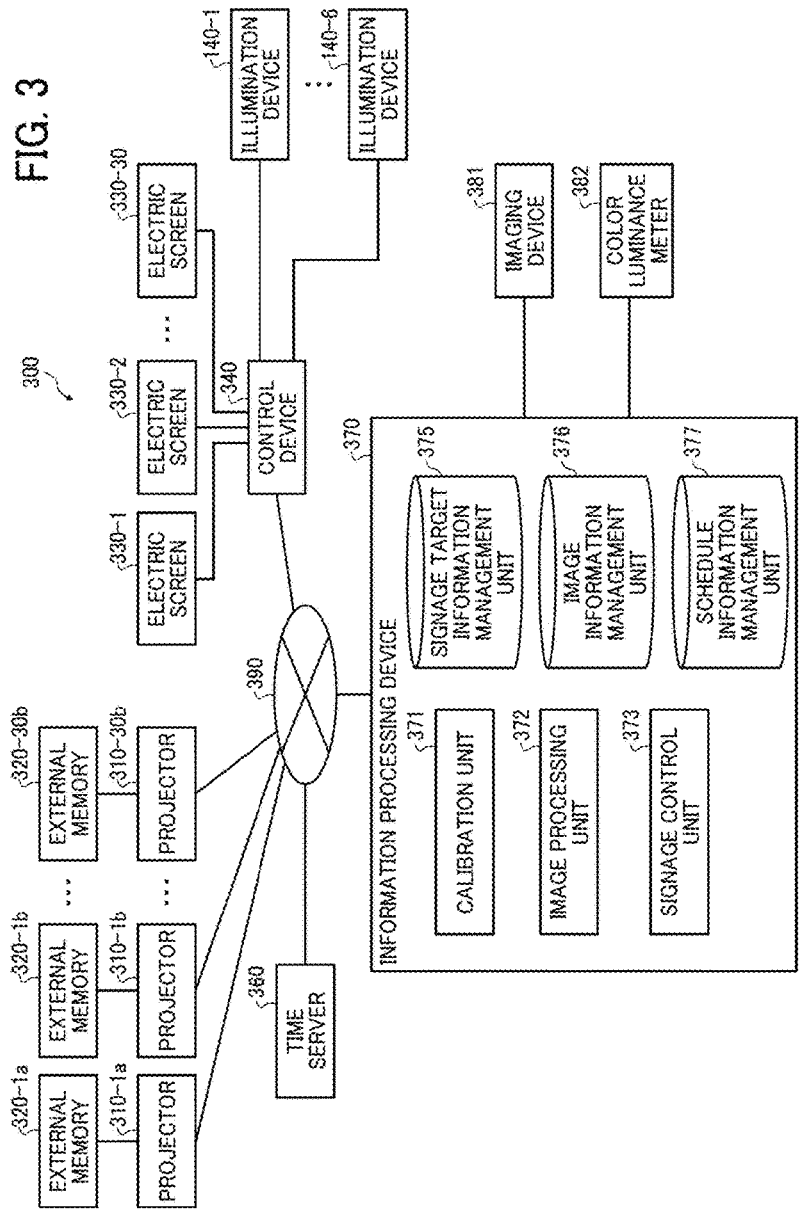

| | | WINDOW INFORMATION | | | | | ILLUMI- |
|---|---|---|---|---|---|---|---|
| FLOOR | WINDOW ID | POSITION | HORIZON-TAL SIZE | VERTICAL SIZE | PROJECTOR ID | ELECTRIC SCREEN ID | NATION DEVICE ID |
| 2F | W201 | (0, 0) | $x_{12}$ | $y_{12}$ | PJ201A | SC201 | E200 |
| | | | | | PJ201B | | |
| | W202 | $(x_{21}, 0)$ | $x_{22}-x_{21}$ | $y_{12}$ | PJ202A | SC202 | |
| | | | | | PJ202B | | |
| | W203 | $(x_{31}, 0)$ | $x_{32}-x_{31}$ | $y_{12}$ | PJ203A | SC203 | |
| | | | | | PJ203B | | |
| | W204 | $(x_{41}, 0)$ | $x_{42}-x_{41}$ | $y_{12}$ | PJ204A | SC204 | |
| | | | | | PJ204B | | |
| | W205 | $(x_{51}, 0)$ | $x_{52}-x_{51}$ | $y_{12}$ | PJ205A | SC205 | |
| | | | | | PJ205B | | |
| 3F | W301 | $(0, y_{21})$ | $x_{12}$ | $y_{22}-y_{21}$ | PJ301A | SC301 | |
| | | | | | PJ301B | | |

Signage target information (Signage target ID: S001) — 500

FIG. 6

IMAGE INFORMATION 600

| MOVIE OR IMAGE ID | SIGNAGE TARGET ID | WINDOW ID | PROJECTOR ID | CORRECTION PARAMETER ID | CALCULATION DATE / TIME | DIVIDED STILL IMAGE GROUP ID | PROJECTION MOVIE OR IMAGE ID | GENERATION DATE / TIME |
|---|---|---|---|---|---|---|---|---|
| C100 | S001 | W201 | PJ201A / PJ201B | P201 | 2016.5.25 | C201 | M201A / M201B | 2016.6.10 |
| | | W202 | PJ202A / PJ202B | P202 | 2016.5.25 | C202 | M202A / M202B | 2016.6.10 |
| | | W203 | PJ203A / PJ203B | P203 | 2016.5.25 | C203 | M203A / M203B | 2016.6.10 |
| | | W204 | PJ204A / PJ204B | P204 | 2016.5.25 | C204 | M204A / M204B | 2016.6.10 |
| | | W205 | PJ205A / PJ205B | P205 | 2016.6.20 | C205 | M205A / M205B | 2016.6.10 |
| | | W301 | PJ301A / PJ301B | P301 | 2016.5.25 | C301 | M301A / M301B | 2016.6.10 |

| SCHEDULE INFORMATION (SIGNAGE TARGET ID: S001) (SATURDAY) |||||||||
|---|---|---|---|---|---|---|---|
| SIGNAGE DEVICE \ TIME | 10:00 | 12:00 | 14:00 | 16:00 | 18:00 | 20:00 | 22:00 |
| PROJECTOR |  |  |  |  |  | C100 ⟷ |  |
| ELECTRIC SCREEN |  |  |  |  |  | ⟷ |  |
| ILLUMINATION DEVICE |  |  |  |  | ⟷⟷⟷ | ⟷ |  |

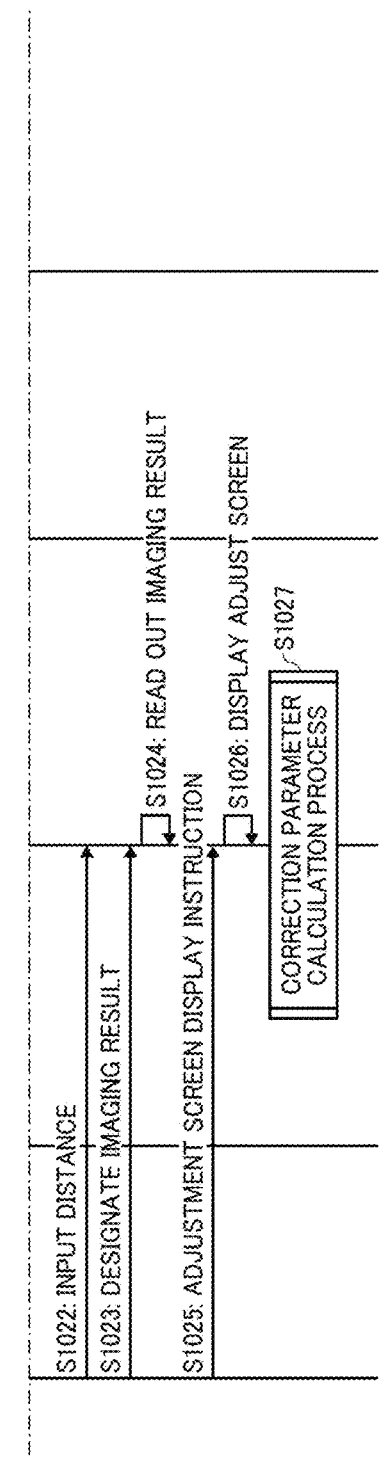

IMAGE PROJECTING SYSTEM, INFORMATION PROCESSING APPARATUS, AND METHOD FOR IMAGE PROJECTING

CROSS-REFERENCE TO RELATED APPLICATIONS

This patent application is based on and claims priority pursuant to 35 U.S.C. § 119(a) to Japanese Patent Application No. 2016-169182, filed on Aug. 31, 2016, the entire contents of which are incorporated by reference herein.

BACKGROUND

Field

The present disclosure relates to an image projecting system, an information processing apparatus, and a method for image projecting.

Description of the Related Art

Digital signage is widely used. In digital signage; content, such as movies or images are distributed to an image projection apparatus, which projects the content on a large screen set outdoors, in a shop front, or in a public space. In the digital signage, content suitable for a particular time and place is projected in real time so that a high advertisement effect is expected.

On the other hand, In order to realize large-scale digital signage using the image projection apparatus described above, a flat surface of a certain size is required as a projection target. For this reason, there is a problem that the applicable place is limited. On the other hand, the scope of application can be expanded if digital signage can be realized by combining and using a plurality of faces included in a predetermined area, for example, a window glass (light transmitting face) of a building. For example, if it is applied to a high-rise building with many window glasses, it is possible to realize a larger digital signage area than before.

In the case of realizing digital signage by combining a plurality of windows, it is necessary to make an adjustment in each of the image projecting devices arranged corresponding to each window glass so that the projection movie or image is appropriately projected. Therefore, when the number of the image projection devices increases, there arises a problem that it takes time for an adjustment process. In particular, when the window glass onto which the images are to be projected is curved, adjustment processing for correcting the distortion at the time of projection becomes necessary, and further time is required.

SUMMARY

An image projection apparatus includes processing circuitry. The processing circuitry is configured to receive, for each surface of a plurality of surfaces in a projection region, an adjustment value to increase or decrease an effective distance from an imaging device to a curved position of the surface. Further, the processing circuitry is configured to determine, for each surface of the plurality of surfaces, a curved shape of the surface in accordance with a change of distortion corresponding to the effective distance that was increased or decreased by the received adjustment value. Further, the processing circuitry is configured to calculate, for each surface of the plurality of surfaces, correction parameters to correct the distortion of projection images projected onto the surface, in accordance with the determined curved shape of the surface. Further, the processing circuitry is configured to divide an image into a plurality of divided images in accordance with positions and sizes of the each surface of the plurality of surfaces in the projection region, and control a plurality of projection devices to respectively project the plurality of divided images onto the plurality of surfaces, each projection device of the plurality of projection devices corresponding to a different projection surface of the plurality of surfaces and projecting a corresponding divided image of the plurality of divided images onto the different projection surface using the corresponding correction parameters for the surface.

BRIEF DESCRIPTION OF THE DRAWINGS

A more complete appreciation of the embodiments and many of the attendant advantages and features thereof can be readily obtained and understood from the following detailed description with reference to the accompanying drawings in which:

FIG. 1 illustrates an example of projection by an image projection system;

FIG. 2A, 2B, and 2C illustrate an example of operation of each signage apparatus set on each window of a building;

FIG. 3 illustrates an example configuration of the image projection system according to an embodiment of the present disclosure;

FIG. 6 illustrates an example of image information;

FIGS. 10A and 10B illustrate a sequence diagram including steps in a first calibration process;

DETAILED DESCRIPTION OF THE DRAWINGS

Figure 2C:
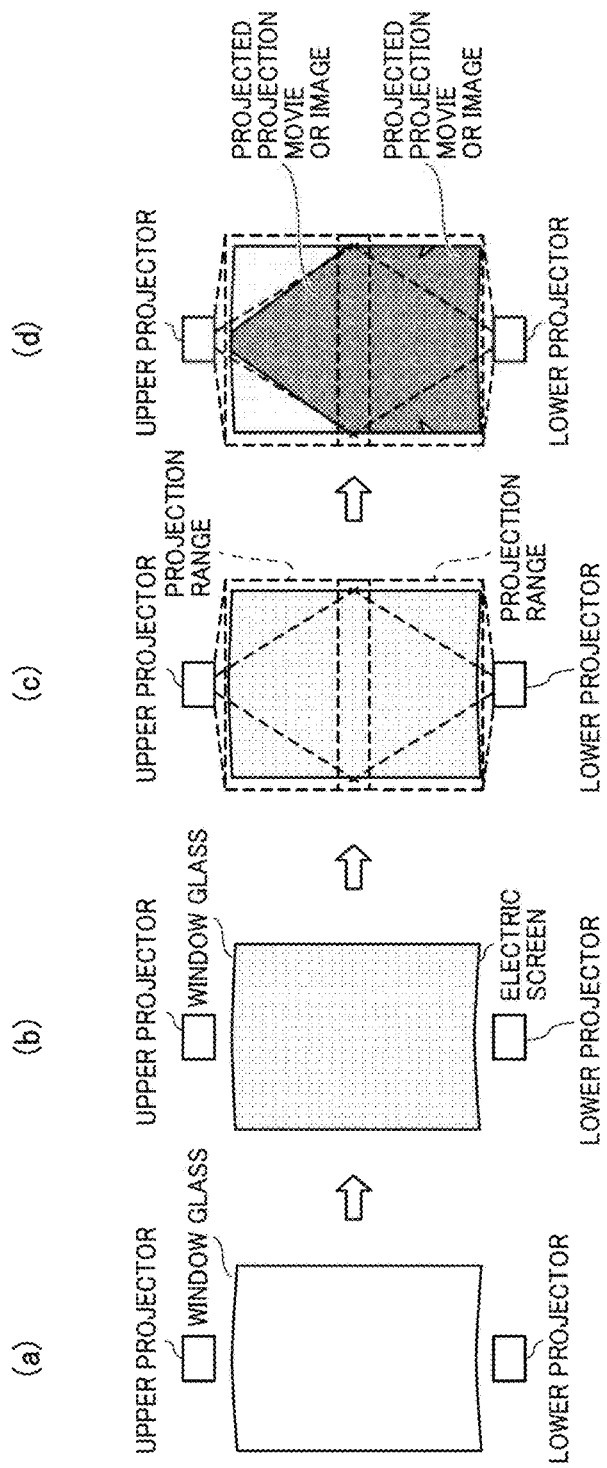

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

As used herein, the singular forms "a", "an", and "the" are intended to include both single and multiple forms, unless the context clearly indicates otherwise.

Hereinafter, a description is given in detail of several embodiments of an image projecting system, an information processing apparatus, a method, and a non-transitory computer-readable medium for image projecting with reference to the appended drawings.

FIG. 1 illustrates an example of projection by an image projection system. As illustrated in FIG. 1, the image projection system realizes large-scale digital signage by combining and using a plurality of window glass (light transmitting surface) portions attached to the curved outer surface of a building 110.

As shown in FIG. 1, a plurality of window glasses (window glass group 120) is attached to the curved outer surface of the building 110 on the road side (30 pieces of window glasses in the example in FIG. 1). The image projection system projects, from the inside of the building 110, each projection movie or image to each of the window glasses. The projection video or image(s) are included in the group of projection movies or images.

Thus, the image projection system realizes a large scale digital signage using the area of the 30 window glasses. In the example of FIG. 1, the image projection system is displaying a huge tree. In addition, the image projection system realizes digital signage at, a place easily accessible to a passenger, such as an outer surface on the road side. In other words, the image projection system realizes digital signage with a high advertisement effect.

Further, according to the image projection system, compared to other digital signage, such as a digital signage using a large screen previously installed or a side wall surface of a building without a window glass, the range of applications of digital signage is expanded.

Next, the operation of each signage device (which is referred to as a projector (projection device), an electric screen (projection surface), an illuminator in the present embodiment) comprising the image projection system is explained.

FIGS. 2A, 2B, and 2C illustrate an example operation of each signage apparatus set on the each window of a building. From (a) to (d) in FIG. 2C is an illustration of the operation of electric screen and projector among each signage apparatus disposed inside the respective window grasses of the building 110 showed by FIG. 2A, As shown in (a) of FIG. 2C, projectors are arranged on the upper and lower sides of each window glass of the building 110. For one window glass, a projection movie or image is projected using two projectors (upper projector and lower projector). Thus, even when the size of the window glass is large, an appropriate projection movie or image is projected. In the present embodiment, it is assumed that each of the window glasses has a curved shape along the curved outer surface of the building 110.

Further, as shown in (b) of FIG. 2C, an electric screen is disposed inside each window glass of the building 110. When the projection movie or image is projected by using the projectors, each window glass is made translucent by setting the electric screen to the ON state for changing the light transmittance. In addition, the electric screen (projection surface) forms a light transmitting surface together with the window glass (projection target).

Diagram (c) of FIG. 2C illustrates a state in which the lamps of the upper projector and the lower projector are turned on after turning on the electric screen. The projection range of the upper projector is the upper side of the window glass. The projection range of the lower projector is the lower side of the window glass. It should be noted that the upper projector and the lower projector are adjusted so that a part of the projection range overlaps. That is, in the present embodiment, the two projectors project projection movies or images to the projection range corresponding to the size of the window glass.

As illustrated in (d) of FIG. 2C, the projection movie or image is projected by the upper projector and the lower projector. In the image projection system according to the present embodiment, a projection movie or image is projected on each electric screen corresponding to each window glass included in the window glass group 120, thereby realizing one digital signage as a whole. Therefore, in each electric screen corresponding to each window glass, the projection movie or image generated based on the movie or image of the partial area of the original movie or image (provided by advertiser) is vertically divided and projected by the two projectors.

As shown in FIG. 2B, in the image projection system, in a state in which projection of the projection movie or image group 130 is completed, the illumination device group 140 (the illumination devices 140-1 to 140-6) and the electric screen are controlled to be in the OFF state.

That is, in the image projection system, the upper projector, the lower projector, the electric screen, and the illumination device group 140 operate in conjunction with each other.

Next, the system configuration of the image projection system is described. FIG. 3 illustrates an example configuration of the image projection system. As shown in FIG. 3, the image projection system 300 includes projectors 310-1a to 310-30b, external memories 320-1a to 320-30b, electric screens 330-1 to 330-30, a control device 340, and illumination devices 140-1 to 140-6. Further, the image projection system 300 includes time server 360, information processing apparatus 370, imaging apparatus 381, and color luminance meter 382.

The projectors 310-1a to 310-30b, the control device 340, the time server 360, and the information processing apparatus 370 are connected to each other via a network 390.

The projectors 310-1a to 310-30b are disposed above and below the inside of each of the window glass groups 120 included in a predetermined area on the outer surface of the building 110. As described above, since 30 pieces of window glass are attached to a predetermined area on the outer surface of the building 110, in the present embodiment, 60 projectors are arranged.

The projectors 310-1a to 310-30b execute a first calibration process using the calibration pattern image (calibration image) so that the projection movie or image is projected without distortion in the projection range corresponding to the size of the window glass to be projected. In addition, each of the projectors 310-1a to 310-30b executes a second calibration process using a white image so that the projection movie or image is projected with a predetermined color tint to the window glass to be projected.

In addition, the projectors 310-1a to 310-30b read the specified projection movie or image from the projection movies or images stored in the external memories 320-1a to 320-30b, respectively, based on the projection start instruction from the information processing apparatus 370. Further, the projectors 310-1a to 310-30b project the movie or image for projection read out by the projectors 310-1a to 310-30b onto the electric screen corresponding to the window glass to be projected.

The external memories 320-1a to 320-30b are connected to the projectors 310-1a to 310-30b respectively. The external memories 320-1a to 320-30b store projection movie or images projected by the projectors 310-1a to 310-30b, respectively. The external memories 320-1a to 320-30b include, for example, a USB (Universal Serial Bus) memory and the like.

The electric screens 330-1 to 330-30 are disposed inside the respective window glass groups 120 included in a predetermined area on the outer surface of the building 110. As described above, 30 windows are attached to predetermined areas on the outer surface of the building 110, so 30 electric screens are arranged in this embodiment.

The electric screens 330-1 to 330-30 are connected to the control device 340 via the power supply cable, and the ON state and the OFF state are individually controlled by the control device 340. When the electric screens 330-1 to 330-30 are controlled to be in the ON state by the control device 340, the light transmitting surface of the electric screens 330-1 to 330-30 are each in a translucent state by lowering the light transmittance.

The control device 340 turns on the electric screens 330-1 to 330-30 based on the screen ON instruction from the information processing apparatus 370. Further, the control device 340 turns off the electric screens 330-1 to 330-30 based on the screen OFF instruction from the information processing apparatus 370.

Further, the control device 340 turns on the illumination devices 140-1 to 140-6 based on the illumination ON instruction from the information processing apparatus 370. Further, the control device 340 turns OFF the illumination device 140-1-140-6 based on the illumination OFF instruction from the information processing apparatus 370.

The illumination devices 140-1 to 140-6 are connected to the control device 340 via a power supply cable, and the ON state and the OFF state are controlled by the control device 340.

The time server 360 provides time information to the information processing apparatus 370 in order to synchronize the time between the projectors 310-1a to 310-30b and the information processing apparatus 370.

The information processing apparatus 370 is a device for controlling signage processing in the image projection system 300. In the information processing apparatus 370, a proofreading program, an image processing program, and a signage control program are installed. By executing these programs with processing circuitry such as a CPU, the information processing apparatus 370 functions as a calibration unit 371, an image processing unit 372, and a signage control unit 373.

The calibration unit 371 executes the first calibration process and the second calibration process together with the projectors 310-1a to 310-30b. Further, the calibration unit 371 executes the first calibration process to calculate correction parameters to be used for generation of projection movies or images projected by the projectors 310-1a to 310-30b, respectively.

Further, the calibration unit 371 calculates the RGB levels to be set in the projectors 310-1a to 310-30b by executing the second calibration process together with the projectors 310-1a to 310-30b.

The image processing unit 372 is an example of a dividing unit. The image processing unit 372 reads the signage target information stored in the signage target information management unit 375 and the image information stored in the image information management unit 376. Further, the image processing unit 372 generates the projection movie or image from the original movie or image provided from the advertiser. The signage target refers to a building 110 in which a large-scale digital signage is realized using the image projection system 300. The signage target information includes information such as the position and size of each window glass of the window glass group 120 included in a predetermined area on the outer surface of the building 110. Further, the image information includes various images used for generation of the projection moving or image, and information for managing correction parameters and the like.

The image processing unit 372 uses the correction parameter calculated by the calibration unit 371 in generating the projection movie or image.

Further, the image processing unit 372 stores the divided still image (details will be described later) generated in the process of generating the projection movie or image in the image information management unit 376. Further, the image processing unit 372 transmits the generated projection movies or images of the group of projection movies or images to each of the projectors 310-1a to 310-30b. Accordingly, the projectors 310-1a to 310-30b store the respective projection movies or images in the external memories 320-1a to 320-30b, respectively.

The signage control unit 373 is an example of a control unit. The signage control unit 373 performs a signage control process based on schedule information stored in the schedule information management unit 377. For example, the signage control unit 373 transmits a projection start instruction or a projection end instruction to each of the projectors 310-1a to 310-30b according to the projection start time or end time indicated based on the schedule information. In addition, the signage control unit 373 transmits a screen ON instruction or a screen OFF instruction to the electric screens 330-1 to 330-30 according to the projection start time or end time indicated based on the schedule information. Furthermore, the signage control unit 373 transmits an illumination OFF instruction or an illumination ON instruction to the illumination devices 140-1 to 140-6 according to the projection start time or end time indicated based on the schedule information.

When each of the projectors 310-1a to 310-30b executes the first calibration processing, the imaging device 381 photographs the calibration pattern image projected by each of the projectors 310-1a to 310-30b, and transmits the calibration pattern image to the information processing apparatus 370. The imaging device 381 and the information processing apparatus 370 are connected via, for example, a USB cable.

When each of the projectors 310-1a to 310-30b executes the second calibration processing, the color luminance meter 382 measures the color temperature of the white image projected by each of the projectors 310-1a to 310-30b and transmits the measurement result to the information processing apparatus 370. The color luminance meter 382 and the information processing apparatus 370 are connected via a USB cable, for example.

Figure 4:
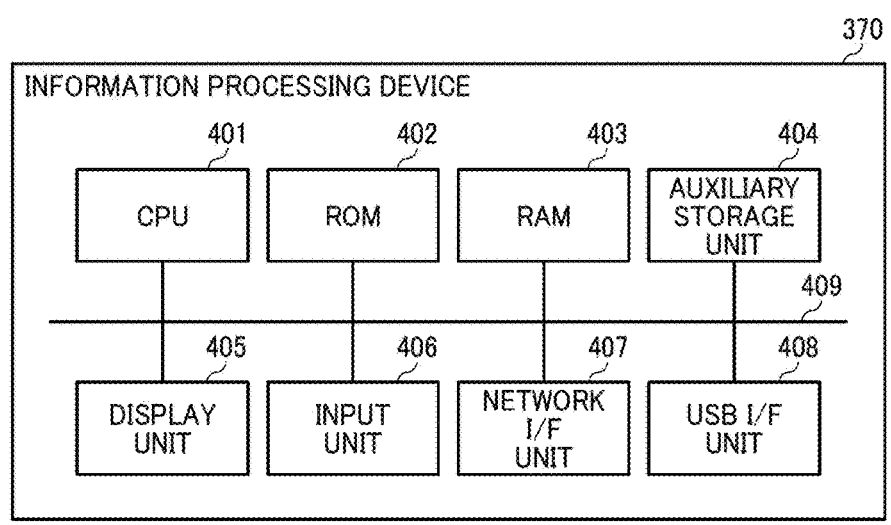
FIG. 4 illustrates an example hardware configuration of an information processing apparatus according to an embodiment of the present disclosure.

Next, the hardware configuration of the information processing apparatus 370 will be described. FIG. 4 illustrates an example hardware configuration of an information processing apparatus.

As shown in FIG. 4, the information processing apparatus 370 includes CPU (Central Processing Unit) 401, ROM (Read Only Memory) 402, and RAM (Random Access Memory) 403. CPU 401, ROM 402, and RAM 403 form a computer. Further, the information processing apparatus 370 includes the auxiliary storage unit (memory) 404, display 405, input unit 406, network I/F (interface) unit 407, and USB I/F unit 408. The respective hardware of the information processing apparatus 370 are mutually connected via bus 409.

CPU 401 is a device that executes various programs (for example, a calibration program, an image processing program, a signage control program, etc.) stored in the auxiliary storage unit 404. The CPU 401 is an example of processing circuitry.

ROM 402 is a nonvolatile main storage device. ROM 402 stores various programs, data, and the like necessary for CPU 401 to execute various programs stored in the auxiliary storage unit 404. Specifically, ROM 402 stores a boot program such as Basic Input/Output System (BIOS) and Extensible Firmware Interface (EFI).

RAM 403 is a volatile main storage device such as DRAM (Dynamic Random Access Memory) or SRAM (Static Random Access Memory). RAM 403 provides a work area to be expanded when various programs stored in the auxiliary storage unit 404 are executed by CPU 401.

In an exemplary implementation, CPU 401, in conjunction with any of ROM 402 and RAM 403 may be a general or specific-purpose processor, a digital signal processor (DSP), an ASIC, a field programmable gate array (FPGA) or other programmable logic device (PLD), a discrete gate or transistor logic, discrete hardware components or any other combination for executing functions to realize logic blocks. CPU 401 may include modules, pans, circuits and/or integrated circuits, all of which may be referred to as processing circuitry. The processing circuitry may include a general-purpose processor, and, the processing circuitry may include any number of processors, controllers, micro-controllers or state machines. The processing circuitry can also be a combination of computer equipment, such as a combination of a DSP and a micro-processor, a combination of plural micro-processors, or a combination of a DSP and plural micro-processors. The processing circuitry of image processing device 1 may separately or jointly implement each of functionality of the components illustrated in FIG. 4.

The auxiliary storage unit 404 is an auxiliary storage device that stores various programs executed by the CPU 401 and various information used when various programs are executed. Various information stored in the auxiliary storage unit 404 includes signage target information, image information, various information managed by schedule information and image information, correction parameters, and the like. The signage target information management unit 375, the image information management unit 376, and the schedule information management unit 377 are realized by the auxiliary storage unit 404.

The display unit 405 is a display device that displays various screens. The input unit 406 is an input device for inputting various information to the information processing apparatus 370. The network I/F unit 407 is an interface device for connecting to the network 390. The information processing apparatus 370 performs communication with the projectors 310-1a to 310-30b, the control device 340, and the time server 360 via the network I/F unit 407.

The USB PT unit 408 is an interface device for connecting a USB cable. The information processing apparatus 370 transmits and receives data to and from the imaging device 381 and the color luminance meter 382 via the USB I/F unit 408.

Next, various kinds of information (signage target information, image information, schedule information) stored in each management unit (signage target information management unit 375, image information management unit 376, schedule information management unit 377) of the information processing apparatus 370 will be described.

Figures 5A, 5B:
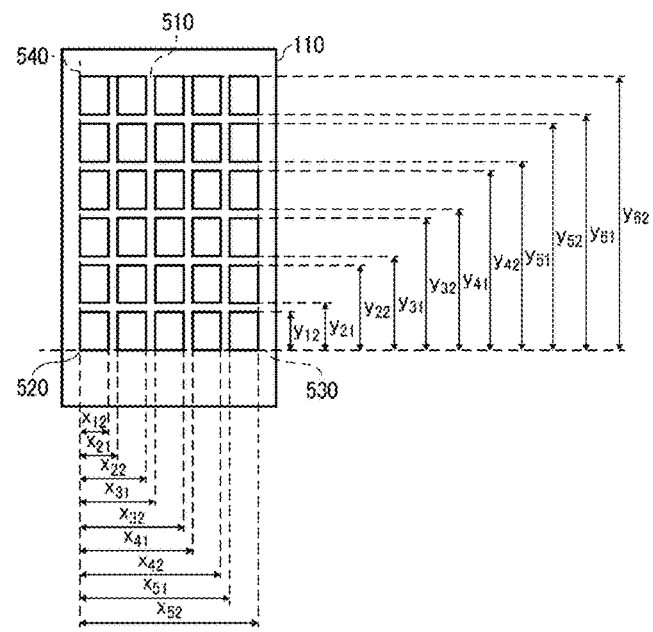
FIGS. 5A and 5B illustrate an example of signage target information.

First, the signage target information stored in the signage target information management unit 375 will be described. FIG. 5A is a diagram showing an example of signage target information. As shown in FIG. 5A, the signage target information 500 is generated for each signage target. In the present embodiment, the signage target ID of the building 110 is "S 001".

As shown in FIG. 5A, "floor", "window ID", "window information", "projector ID", "electric screen ID", and "Illumination device ID" are included in the signage target information 500.

A floor number is stored in the "Floor" field. The floor number indicates a floor to which the window glass group 120 included in a predetermined area on the outer surface of the building 110 is attached.

In the "window ID" field, an identifier for identifying each window glass of the window glass group 120 included in a predetermined area on the outer surface of the building 110 is stored.

In the "window information" portion, "position", "horizontal size", and "vertical size" are stored. Here, with reference to FIG. 5B, "position", "horizontal size" and "vertical size" of each window glass stored in "window information" will be described. FIG. 5B schematically shows the curved outer surface of the building 110 converted to plane coordinates.

As shown in FIG. 5B, the image projection system 300 realizes a large-scale digital signage using a predetermined area 510 on the outer surface of the building 110. At this time, the image projection system 300 defines the reference point (origin) and the reference axes (x axis, y axis) when specifying the layout of each window glass included in the predetermined region 510.

In FIG. 5B, the point 520 indicates the origin in the predetermined region 510. In addition, the axis 530 indicates the x-axis when the point 520 is the origin in the predetermined region 510, and the axis 540 indicates the y-axis when the point 520 is the origin in the predetermined region 510.

As shown in FIG. 5B, by defining the predetermined area 510, the origin 520, the x axis 530, and the y axis 540, the layout (position, horizontal size, vertical size) of each windowpane is uniquely specified.

Returning to the explanation of FIG. 5A, in the "position" field, coordinates indicating the position of the lower left corner of each windowpane in the predetermined area 510 on the outer surface of the building 110 are stored. In the case of FIG. 5A, the coordinates of the lower left corner position of the window glass with the window ID="W 201" is the origin (0, 0).

In the "horizontal size" field, the horizontal length (width) of each window glass is stored. For example, in the case of a window glass with window ID="W201", the coordinates of the position of the lower left corner is (0, 0) and the coordinates of the position of the lower right corner is (x12, 0). Therefore, the horizontal size="x12". In the case of the window glass with the window ID="W202", the coordinates of the position of the lower left corner is (x21, 0) and the coordinates of the position of the lower right corner is (x22, 0). Therefore, the horizontal size="x22−x21".

In the "vertical size" field, the vertical length (height) of each window glass is stored. For example, in the case of a window glass with window ID="W201", the coordinates of the position of the lower left corner is (0, 0) and the coordinates of the position of the upper left corner is (0, y12). Therefore, the vertical size="y12". In the case of the window glass with the window ID="W301", the coordinates of the position of the lower left corner is (0, y21) and the coordinates of the position of the upper left corner is (0, y22). Therefore, the vertical size="y22-y21".

In the "projector ID" field, an identifier identifying a projector arranged at a position corresponding to each window glass is stored. In the example of FIG. 5A, projectors identified by projector IDs="PJ201A" and "PJ201B" are arranged at positions corresponding to the window glass identified by the window ID="W201" respectively.

In the "electric screen ID" field, an identifier identifying the electric screen arranged at the position corresponding to each window glass is stored. In the example of FIG. 5A, at the position corresponding to the window glass identified by the window ID="W201", it indicates that the electric screen identified by the electric screen ID="SC201" is arranged.

In the "illumination device ID" field, an identifier for identifying the illumination device arranged at a position corresponding to any window glass on each floor is stored. In the example of FIG. 5A, on the floor identified by the floor="2F", it is indicated that the illumination device identified by the illumination device ID="E200" is arranged.

Next, the image information stored in the image information management unit 376 will be described. FIG. 6 is a diagram showing an example of image information. As shown in FIG. 6 the image information 600 includes "movie or image ID", "signage target ID", "window ID", and "projector ID" as items of information. Also, the image information 600 includes "correction parameter ID", "calculation date/time", "divided still image group ID", "projection movie or image ID", and "generation date/time" as items of information.

In the "movie or image ID" field, an identifier for identifying the original movie or image provided from the advertiser is stored. In the example of FIG. 6, the movie or image identified by "C100" as the movie or image ID is stored in the image information management unit 376.

As the "signage target ID", an identifier identifying the building 110 is stored. The building 110 realizes a digital signage based on the original movie or image provided from the advertiser. The example in FIG. 6 shows that digital signage, based on the movie or image identified by the movie or image ID="C100", is realized in the building 110 identified by the signage target ID="S001".

In the "window ID" field, an identifier identifying each window glass of the window glass group 120 included in the predetermined area 510 on the outer surface of the building 110 identified by the signage target ID="S001" is stored.

In the "projector ED" field, an identifier for identifying a projector arranged at a position corresponding to each window glass identified by the window ID is stored.

In the "correction parameter ID" field, an identifier identifying the correction parameter calculated by the calibration unit 371 is stored. As described above, as the first calibration process is executed, the correction parameter ID is stored in association with the window ID in the calibration unit 371 in order to calculate the correction parameter for each windowpane. In the "calculation date and time" field, the date and time when the correction parameter was calculated is stored.

In the "divided still image group ID" field, an identifier identifying, a divided still image group is stored. The divided still image group is generated in the process of generating a projection movie or image group based on the movie or image identified by movie or image ID="C100".

In the "movie or image ID for projection" field, an identifier identifying each projection movie or image included in the projection movie, or image group generated based on the movie or image identified by the movie or image ID="C100" is stored.

In the "generation date and time" field, the date and time at which each projection movie or image identified by the projection movie or image ID was generated is stored.

In the example of FIG. 6, projection movie or image ID="M201A", "M201B" . . . are generated from a movie or image with movie or image ID="C100".

Further, according to the example of FIG. 6, the projecting movie or image with the projecting movie or image ID="M 201A" is projected by the projector with the projector ID="PJ 201A" placed at the position corresponding to the window glass with the window ID="W201".

Further, according to the example of FIG. 6, when the projection movie or image with projection movie or image ID="M 201A" is generated, the correction parameter (correction parameter ID="P201") is calculated at "May 25, 2016".

Further, according to the example of FIG. 6, the divided still image group of the divided still image group ID="C 201" is corrected by the correction parameter (correction parameter ID="P201"). Further, according to the example of FIG. 6, based on the corrected divided still image group with ID="C201", the projection movie or image ID="M 201 A" and "M201B" are generated on Jun. 10, 2016.

Figures 7, 8:
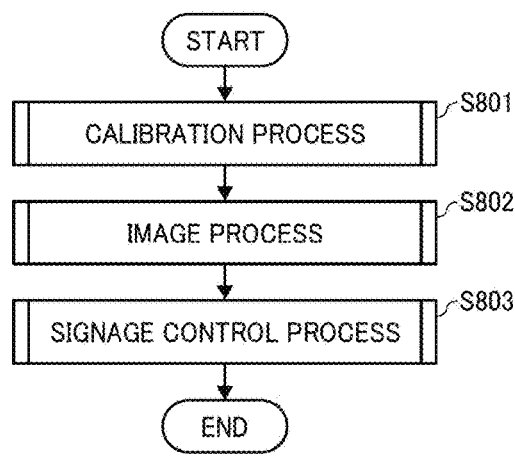
FIG. 7 illustrates an example of schedule information.
FIG. 8 illustrates a flowchart diagram including steps in a process of signage.

Next, the schedule information stored in the schedule information management unit 377 will be described. FIG. 7 is a diagram showing an example of the schedule information. As shown in FIG. 7, the schedule information 700 is generated for each signage target. Further, as shown in FIG. 7, the schedule information 700 includes "time" and "signage device" as items of information.

In the "Time" field, a time zone in which the window glass group 120 of the building 110 identified by the signage target ID="S001" can be used as a digital signage is stored. According to the example of FIG. 7, in the building 110, it is possible to use the window glass group 120 as a digital signage in the time zone between 10:00 and 22:00.

The "Signage device" heading further includes "projector", "electric screen", and "illumination device" fields. The "projector" field stores the time period during which the projection movie or image is projected by the projectors 310-1a to 310-30b. According to the example of FIG. 7, a group of projection movies or images ("content 100") generated based on movie or image ID="C100" "is projected between 20.00 and 21:00.

The "electric screen" field stores the time period during which the electric screens 330-1 to 330-30 are in the ON state. The time period during which the electric screens 330-1 to 330-30 are in the ON state is the same time period as the time period (20:00 to 21:00) in which the projection movie or image group is projected by the projectors 310-1a to 310-30b.

In the "illumination device" field, the time zone during which the illumination devices 140-1 to 140-6 are in the ON state is stored. In the present embodiment, the illumination device 140-1 to 140-6 are in the ON state after the evening (in the example of FIG. 7, after 17:30). However, the time period during which the projection movie or image is projected by the projectors 310-1a to 310-30b (between 20:00 and 21:00) is excluded.

Next, the flow of the signage process in the image projection system 300 will be described. FIG. 8 is a flowchart showing the flow of the signage process. When installation of the image projection system 300 is completed in the building 110, the image projection system 300 executes the signage process shown in FIG. 8.

Specifically, in step S801, the image projection system 300 performs calibration processing (first calibration processing, second calibration processing, and the like) of the projectors 310-1a to 310-30b.

In step S802, the image projection system 300 performs image processing (creation of projection movie or images group ("M201A" to "M705B") and transmission of projection movies or images to the projectors 310-1a to 310-30b).

In step S803, the image projection system 300 performs a signage control process. Specifically, the image projection system 300 controls, based on the schedule information 700, the projection start/end control of the projection movie or image group by the projectors 310-1a to 310-30b, controls the ON/OFF of the electric screens 330-1 to 330-30, and controls the ON/OFF of the illumination devices 140-1 to 140-6, based on the schedule information 700.

Next, details of the calibration process (step S801) in the image projection system 300 will be described.

Figure 9:
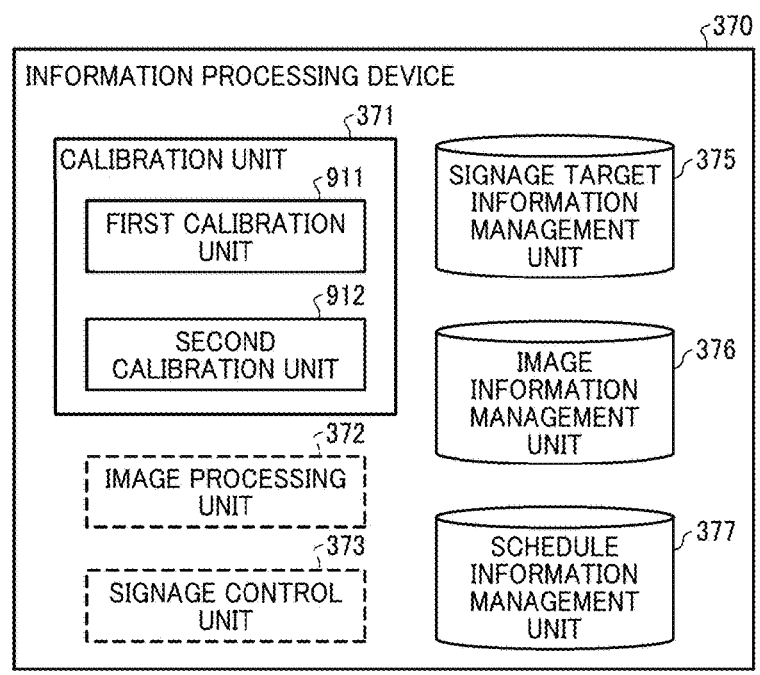
FIG. 9 illustrates an example functional configuration of the calibration part of the information processing apparatus.

First, the functional configuration of the calibration unit 371 of the information processing apparatus 370 for executing the proofreading process will be described. FIG. 9 illustrates an example functional configuration of the calibration part of the information processing apparatus.

As shown in FIG. 9, the calibration unit 371 includes a first calibration unit 911 and a second calibration unit 912. When the first calibration processing is started, the first calibration unit 911 is activated and executes various processes. Specifically, the first calibration unit 911 functions as a calculating unit, and calculates correction parameters (parameters for correcting distortion) to be used for generating the projection movie or image in order to avoid occurrence of distortion in the projected projection movie or image in accordance with the curved shape of the window glass.

In addition, the first calibration unit 911 stores the calculated correction parameters in the image information management unit 376, and stores the correction parameter ID indicating the calculated correction parameter and calculation date and time in the image information 600 in association with the window ID. As a result, the image processing unit 372 generates a projection movie or image without distortion when projected.

When the second calibration process is started, the second calibration unit 912 is activated and executes various processes. Specifically, the second calibration unit 912 calculates the RGB level so that the projection movie or image is projected with a predetermined color, and sets the RGB level for the projectors 310-1a to 310-30b.

Figure 10A:
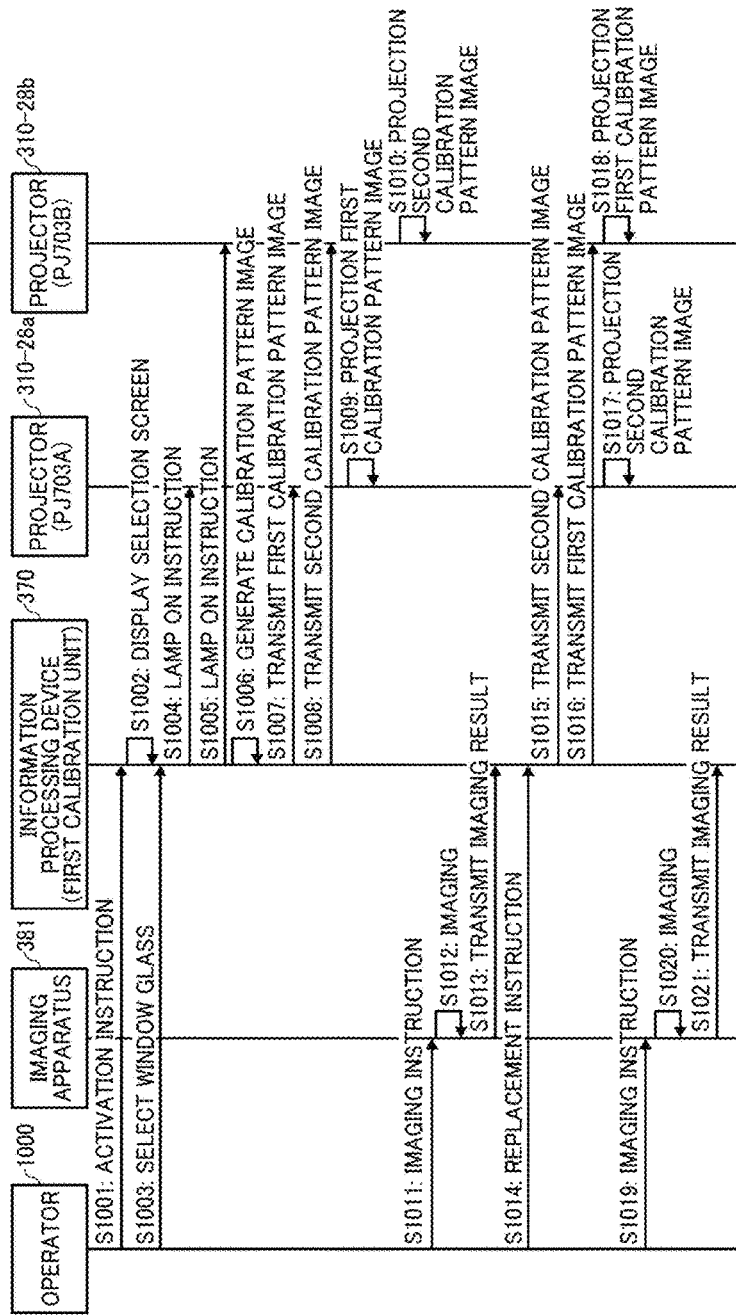

Next, details of the first calibration process will be described with reference to FIGS. 11 to 13 and FIGS. 10A and 10B. FIGS. 10A and 10B illustrate a sequence diagram of the first calibration process.

As shown in FIG. 10A, in step S1001, the operator 1000 inputs an activation instruction for activating the first calibration unit 911 to the information processing apparatus 370.

In response to input of an activation instruction by the operator 1000, the first calibration unit 911 is activated in step S1002, and the display unit 405 of the information processing apparatus 370 is provided with a target (projector) to be selected by the operator 1000 is displayed.

In response to input of the activation instruction by the operator 1000, the first calibration unit 911 is activated in step S1002, and a screen is displayed on the display unit 405 of the information processing apparatus 370. The screen displayed on the display unit 405 is a selection screen for the operator 1000 to select the object (projector) for executing the first calibration process.

In step S1003, the operator 1000 selects the window glass on which the object (projector) to be subjected to the first calibration process is arranged from among the selection screens displayed on the display unit 405.

In response to the window glass being selected by the operator 1000, the first calibration unit 911 identifies the projector located at the position corresponding to the selected window glass. In steps S1004 and S1005, the first calibration unit 911 transmits a lamp ON instruction to each of the identified projectors.

Figure 11:
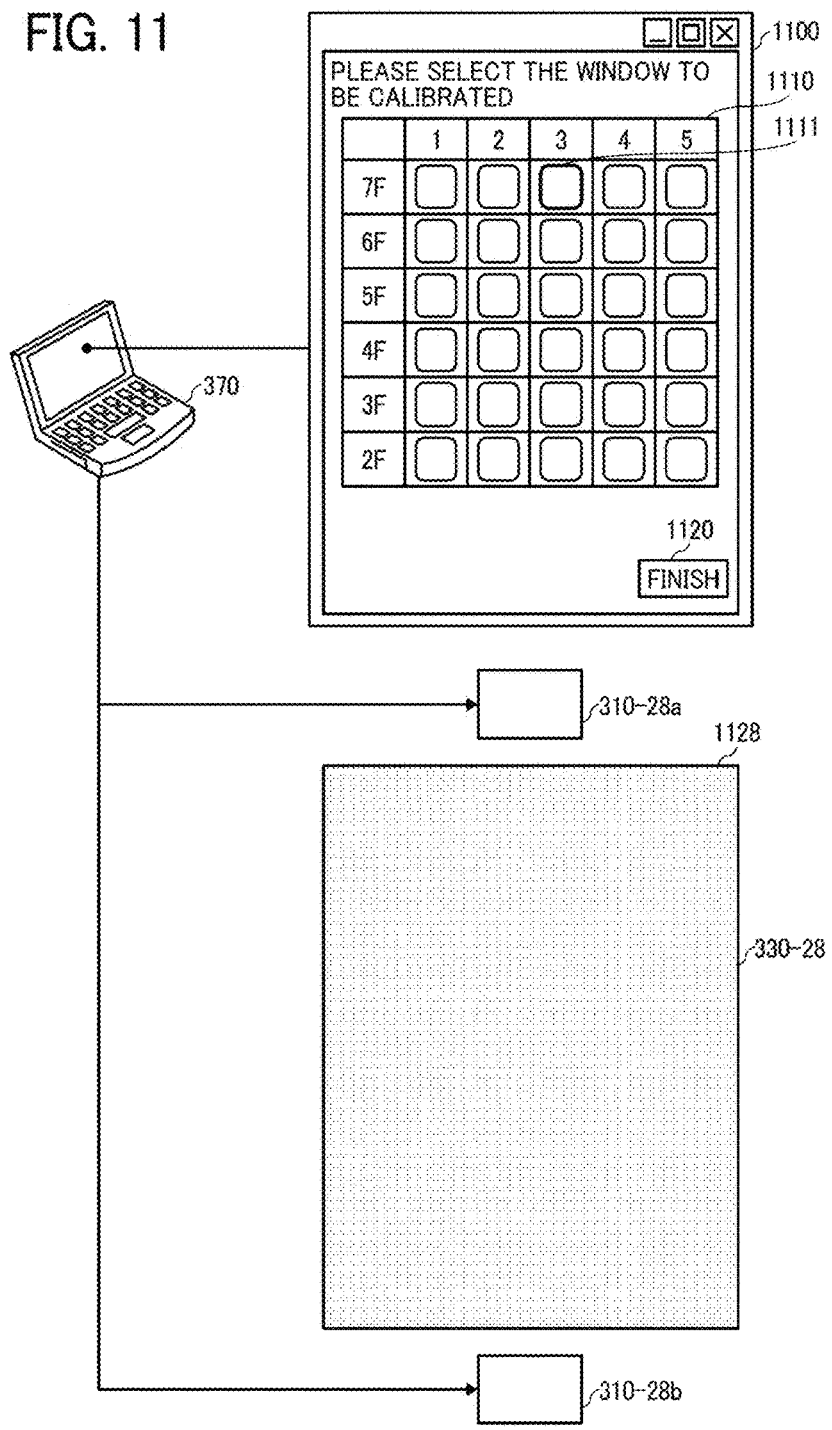
FIG. 11 illustrates an example of a screen displayed on the information processing apparatus during the first calibration process.

FIG. 11 is a diagram showing an example of the screen of the information processing apparatus displayed at the time of the first calibration processing. When the first calibration unit 911 is activated, a selection screen 1100 is displayed on the display unit 405 of the information processing apparatus 370. As shown in FIG. 11, the selection screen 1100 includes the layout 1110 of the window glass group 120 of the building 110.

The operator 1000 presses a rectangular button indicating the window glass in the layout 1110 and presses the completion button 1120 so as to select the window glass on which the object to be subjected to the first calibration process is disposed. The example in FIG. 11 shows a state in which the rectangular button 1111 is pressed and the completion button 1120 is pressed.

The window glass specified by the rectangular button 1111 is the window glass 1128 with the window ID="W703". As shown in the lower part of FIG. 11, a projector 310-28a (projector ID="PJ703 A") and a projector 310-28b (projector ID="PJ703 B") are arranged at positions corresponding to the window glass 1128.

Accordingly, in step S1004, the first calibration unit 911 transmits a lamp ON instruction to the projector 310-28a. In step S1005, the first calibration unit 911 transmits a lamp ON instruction to the projector 310-28b. At this time, it is assumed that the electric screen 330-28 (electric screen ID="SC703") of the window glass 1128 is in the ON state.

Subsequently, in step S1006, the first calibration unit 911 generates a calibration pattern image. The first calibration unit 911 generates two different calibration pattern images as calibration pattern images.

In step S1007, the first calibration unit 911 transmits the first calibration pattern image to the projector 310-28*a*. In step S1008, the first calibration unit 911 transmits the second calibration pattern image to the projector 310-28*b*.

In step S1009, the projector 310-28*a* projects the first calibration pattern image transmitted from the first calibration unit 911. In step S1010, the projector 310-28*b* projects the second calibration pattern image transmitted from the first calibration unit 911.

In step S1011, the operator 1000 inputs an imaging instruction to the imaging device 381 so as to photograph the projected first and second calibration pattern images using the imaging device 381.

In step S1012, the imaging device 381 executes imaging processing on the projected first and second calibration pattern images, and in step S1013, the imaging device 381 transmits the imaging result (captured image) to the information processing apparatus 370.

Figure 12:
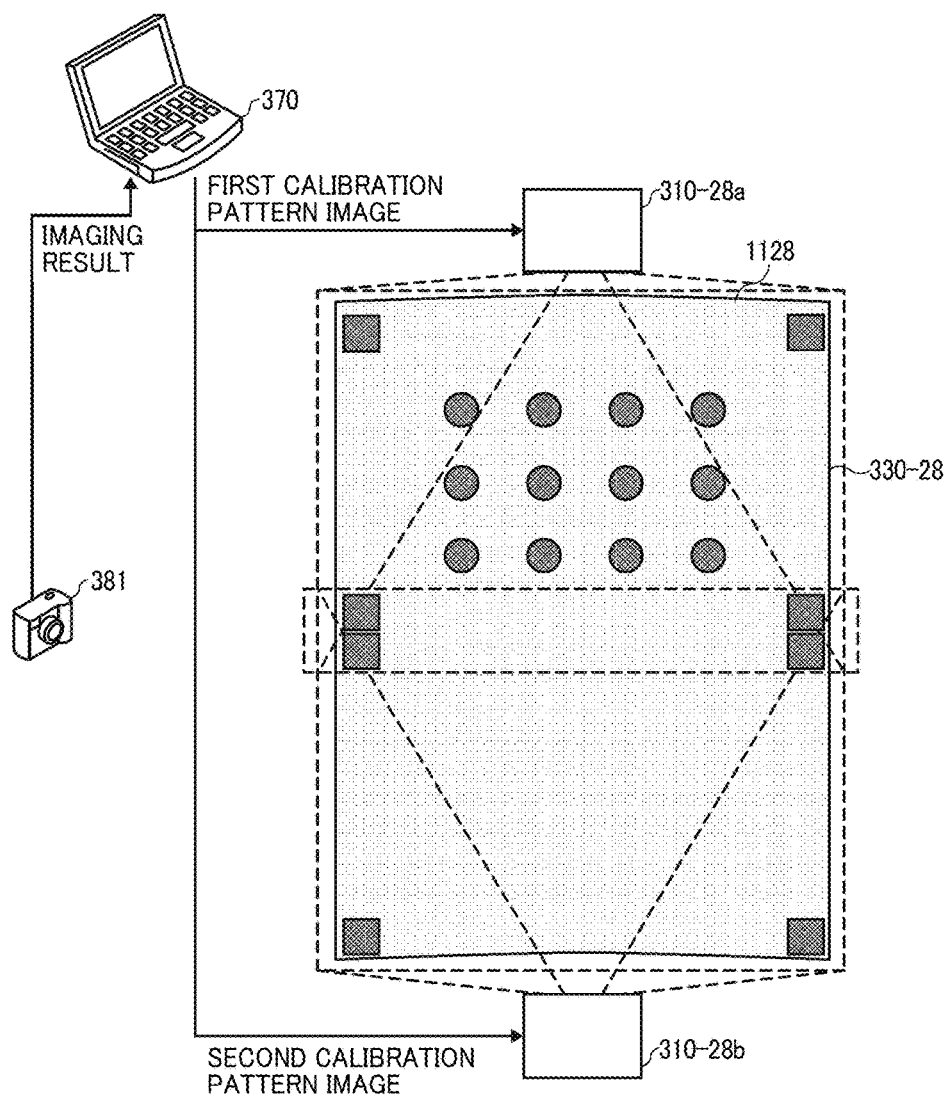
FIG. 12 illustrates an example of a pattern image projected during the first calibration process.

FIG. 12 is a view showing an example of a calibration pattern image projected during the first calibration process. As shown in FIG. 12, the projector 310-28*a* projects the first calibration pattern image, and the projector 310-28*b* projects the second calibration pattern image. The operator 1000 photographs the projected first and second calibration pattern images using the imaging device 381, thereby transmitting the imaging result to the information processing apparatus 370.

In step S1014, the operator 1000 inputs a replacement instruction for replacing the first calibration pattern image and the second calibration pattern image.

In step S1015, the first calibration unit 911 transmits the second calibration pattern image to the projector 310-28*a* according to the replacement instruction. In step S1016, the first calibration unit 911 transmits the first calibration pattern image to the projector 310-28*b*.

In step S1017, the projector 310-28*a* projects the second calibration pattern image transmitted from the first calibration unit 911. In step S1018, the projector 310-28*b* projects the first calibration pattern image transmitted from the first calibration unit 911.

In step S1019, the operator 1000 inputs an imaging instruction to the imaging device 381 so as to photograph the projected second and first calibration pattern images using the imaging device 381.

In step S1020, the imaging device 381 executes imaging processing on the projected second and first calibration pattern images, and in step S1021, the imaging device 381 transmits the imaging result to the information processing apparatus 370.

Figure 13:
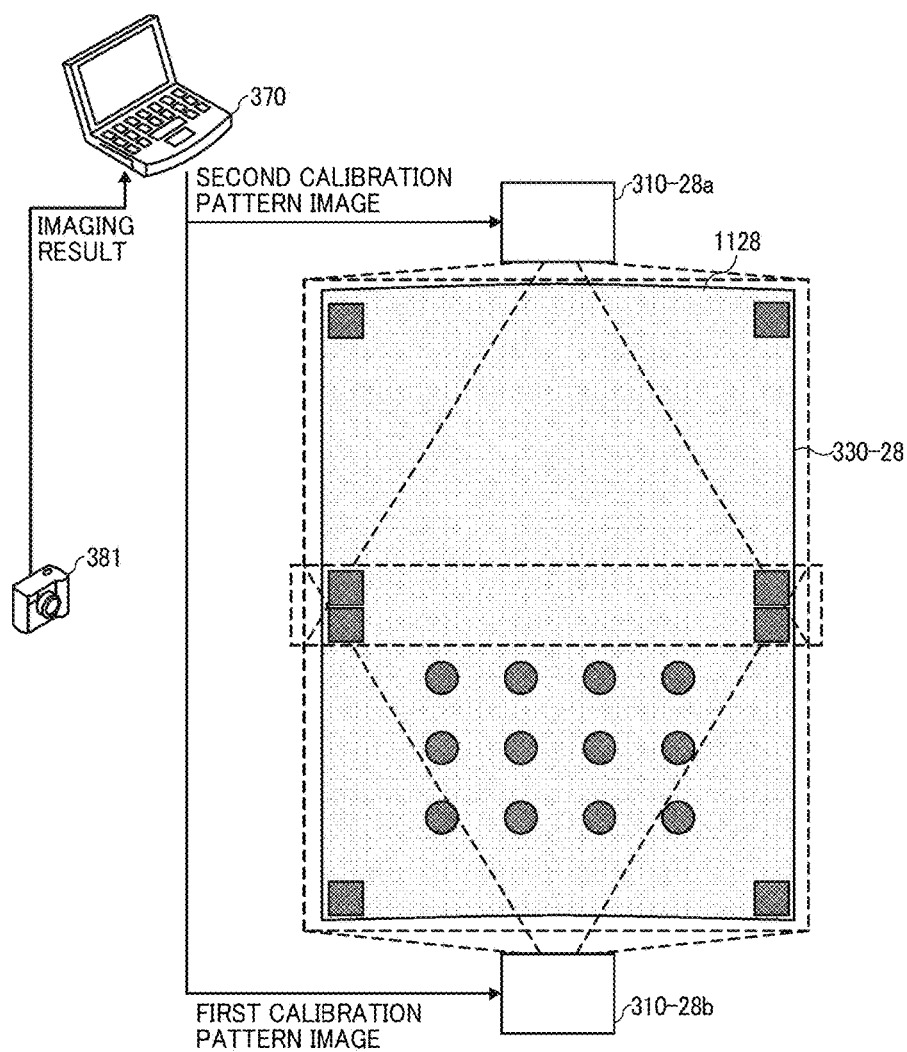
FIG. 13 illustrates another example of a pattern image projected during the first calibration process.

FIG. 13 is a diagram showing another example of the calibration pattern image projected during the first calibration process. As shown in FIG. 13, the projector 310-28*a* projects the second calibration pattern image, and the projector 310-28*b* projects the first calibration pattern image. The operator 1000 photographs the projected second and first calibration pattern images using the imaging device 381, thereby transmitting the imaging result to the information processing device 370.

In step S1022, the operator 1000 inputs the distance from the imaging device 381 to the electric screen when capturing the first and second calibration pattern images with respect to the first calibration unit 911.

In step S1023, the operator 1000 designates the imaging result to be referred to when inputting the adjustment value used for calculating the correction parameter. In step S1024, the first calibration unit 911 reads out the imaging result designated by the operator 1000.

In step S1025, the operator 1000 instructs the first calibration unit 911 to display an adjustment screen for inputting the adjustment value used for calculation of the correction parameter.

As the display instruction of the adjustment screen is input by the operator 1000, the first calibration unit 911 displays the adjustment screen on the display unit 405 in step S1026.

In step S1027, the first calibration unit 911 executes correction parameter calculation processing, and calculates correction parameters used for generation of the projection movie or image based on various adjustment values input by the operator 1000 on the adjustment screen.

Next, the details of the correction parameter calculation process (step S1027) will be described.

Figure 14:
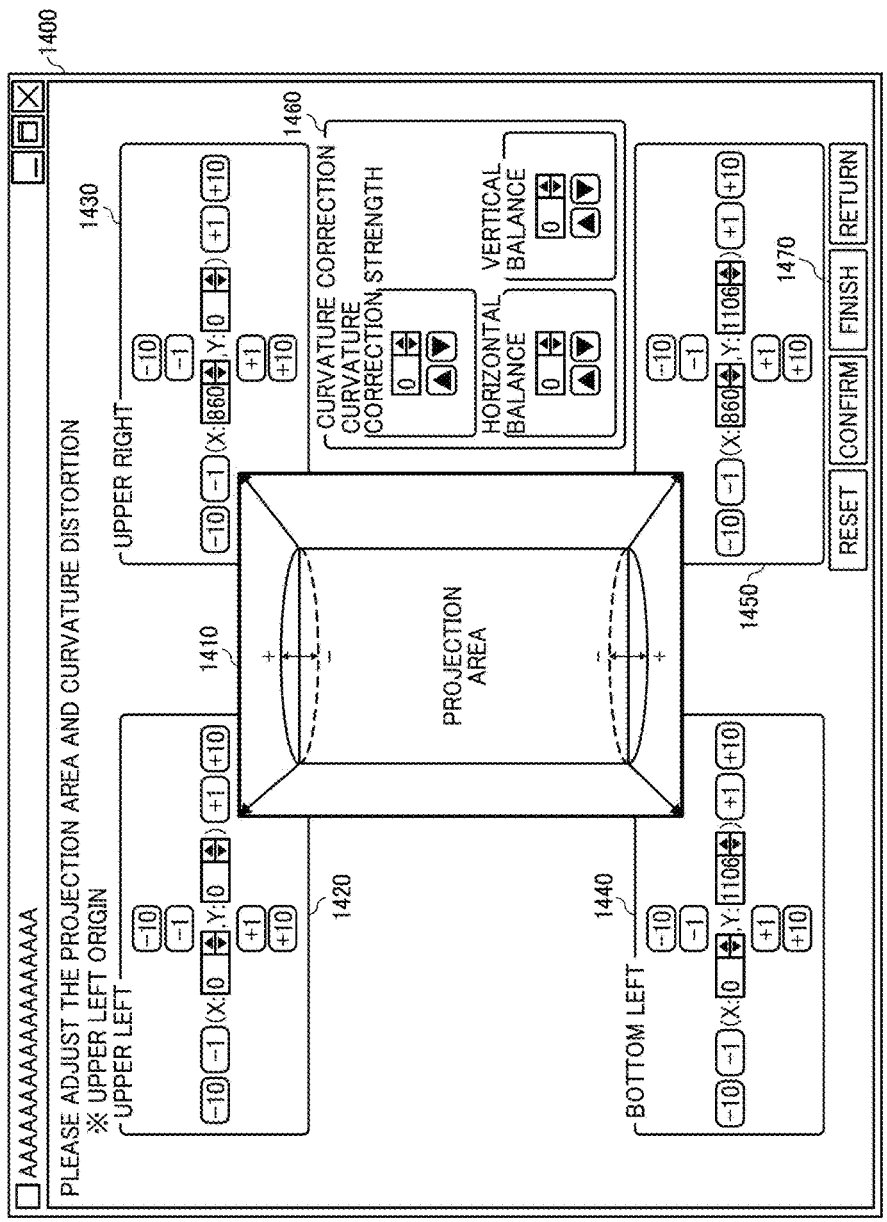
FIG. 14 illustrates an example of an adjustment screen displayed for a calculating process of a correction parameter.

First, the adjustment screen displayed during correction parameter calculation processing will be described. FIG. 14 is a diagram showing an example of the adjustment screen displayed during correction parameter calculation processing. As shown in FIG. 14, the adjustment screen 1400 includes the imaging result display area 1410 for displaying the read imaging results. As the first calibration unit 911 functions as a display unit, the imaging result (or the imaging result on which the image conversion process described later is performed) is displayed in the imaging result display area 1410.

The adjustment screen 1400 includes adjustment columns 1420, 1430, 1440, and 1450 for adjusting the positions of the four vertexes of the imaging result displayed in the imaging result display area 1410. The operator 1000 adjusts the positions of the four apexes of the imaging result so that the imaging result becomes rectangular.

In the adjustment field 1420, the position adjustment value (x coordinate and y coordinate) for matching the position of the upper left vertex of the imaging result with the position of the upper left vertex of the rectangle is input. In the adjustment field 1430, the position adjustment values (x coordinate and y coordinate) for matching the position of the upper right vertex of the imaging result with the position of the upper right vertex of the rectangle are input. In the adjustment field 1440, the position adjustment value (x coordinate and y coordinate) for matching the position of the lower left vertex of the imaging result with the position of the lower left vertex of the rectangle is input. In the adjustment field 1450, the position adjustment value (x coordinate and y coordinate) for matching the position of the lower right vertex of the imaging result with the position of the lower right vertex of the rectangle is input.

As the position adjustment values are input to the adjustment fields 1420 to 1450, the first calibration unit 911 performs image conversion processing on the imaging result so that the four positions of the imaging result displayed in the imaging result display area 1410 move to positions corresponding to the position adjustment value.

Further, the adjustment screen 1400 includes a curvature correction strength input field 1460. The curvature correction strength input field 1460 is an area for inputting the "curvature correction strength," which is the distortion adjustment value for correcting the distortion of the imaging result. As the first calibration unit 911 functions as an input unit, the curvature correction strength is input to the curvature correction strength input field 1460.

In the present embodiment, the electric screen (fir example, the electric screen 330-28) has a shape along the window glass (for example, the window glass 1128), and is curved from the inside to the outside. Therefore, the imaging result obtained by photographing the first and second calibration pattern images projected on the electric screen 330 includes distortion due to the curved shape of the electric screen.

"Curvature correction strength" is a value obtained by normalizing a predetermined range centered on the distance from the imaging device 381 to the deepest part of the electric screen (the outermost bending position of the curved electric screen).

As the curvature correction intensity is input to the curvature correction strength input field 1460, the first calibration unit 911 increases/decreases the distance from the imaging device 381 to the deepest portion of the electric screen. The distortion of the imaging result is corrected by performing image conversion processing on the imaging result based on the increased/decreased distance.

When the distortion of the imaging result is resolved by performing the image conversion processing, the first calibration unit 911 functions as a determining unit, the first calibration unit 911 determines the curved shape of the electric screen based on the distance used for the image conversion processing of the imaging result in which the distortion is resolved. Specifically, the first calibration unit 911 determines the curved shape by calculating the curved depth from the difference between the distance before the increase/decrease and the distance after the increase/decrease. In this manner, the first calibration unit 911 determines the curved shape of the electric screen from the change in the distortion when the distance from the imaging device 381 to the deepest portion of the electric screen is increased/decreased by input of the curvature correction strength.

Next, the curvature correction strength will be described in more detail. As described above, the curvature correction strength is the value obtained by normalizing a predetermined range centered on the distance from the imaging device 381 to the deepest part of the electric screen. The distance (initial value) input in step S1022 of FIG. 10B is used as the center distance.

Specifically, the curvature correction strength is calculated by assigning −100 to 100 as a predetermined range from ½ times the initial value to twice the initial value as the predetermined range.

When distortion is included in the imaging result, the degree of curving of the electric screen (distance from the imaging device 381 to the deepest part of the electric screen) is changed on calculation and reflected on the imaging result, so that the distortion of the imaging result can be corrected.

In one embodiment, instead of an operator 1000 using the user interface directly to change the distance from the imaging device 381 to the deepest portion of the electric screen, it is assumed that the user interface uses curvature correction strength. This is because the operator 1000 has high convenience in correcting the distortion of the imaging result. This will be described in more detail with reference to FIGS. 15 to 17.

Figure 15:
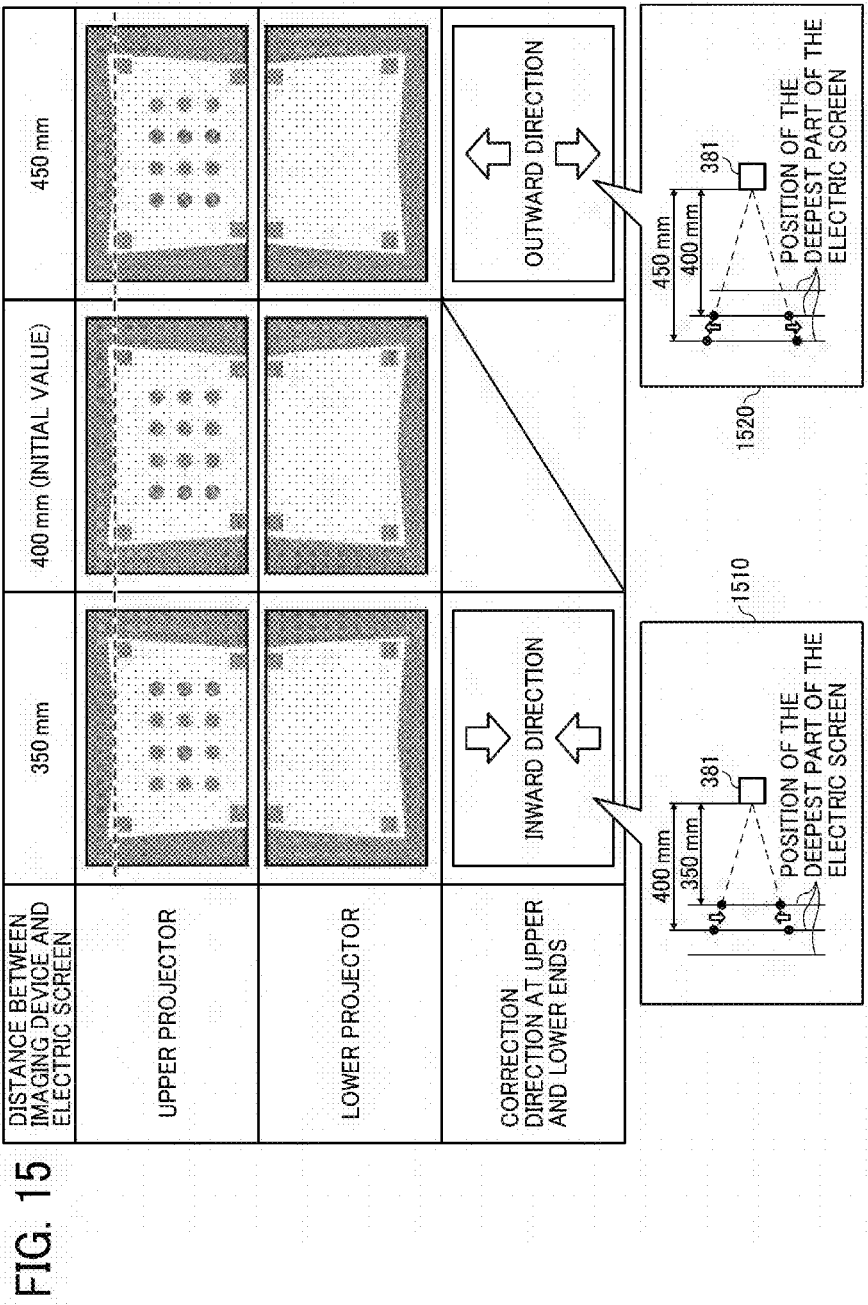
FIG. 15 illustrates a first diagram indicating a relationship between a distance from an imaging apparatus to an electric screen and a correction direction of an imaging result.
Figure 16:
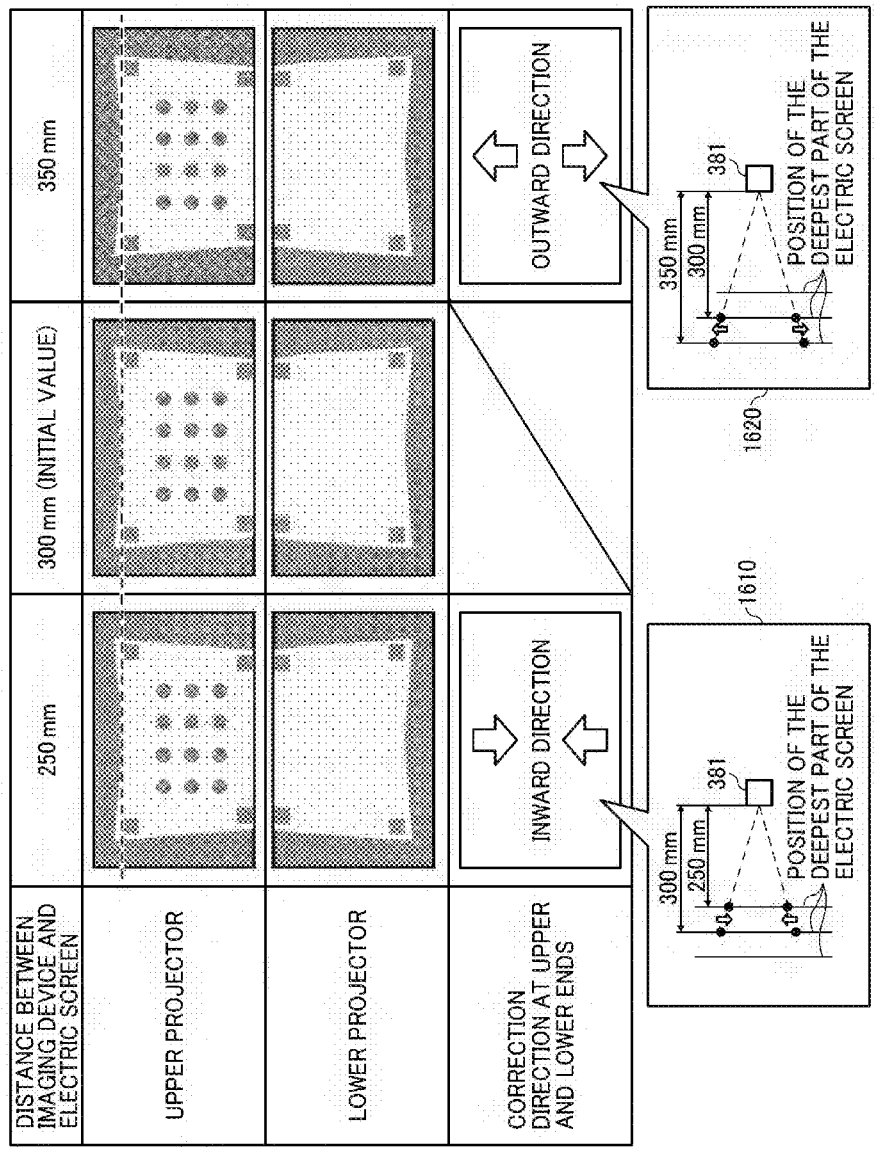
FIG. 16 illustrates a second diagram indicating a relationship between a distance from an imaging apparatus to an electric screen and a correction direction of an imaging result.

FIG. 15 and FIG. 16 are first and second diagrams showing the relationship between the distance from the imaging device to the electric screen and the correction direction of the imaging result. FIG. 15 shows a case where the distance (initial distance from the imaging device 381 to the deepest, portion of the electric screen) input in step S1022 of FIG. 10 is 400 mm.

Here, it is assumed that the operator 1000 changes the distance from the imaging device 381 to the deepest portion of the electric screen to 350 mm. In this case, the imaging result displayed in the imaging result display area 1410 is corrected in the upper and lower ends in the inward direction. When the distance from the imaging device 381 to the deepest portion of the electric screen decreases, the upper end position moves downward and the lower end position moves upward, as indicated by the area 1510. Note that the area 1510 shows the positional relationship of the imaging device 381 and the deepest portion of the electric screen as seen from the side.

Further, it is assumed that the operator 1000 changes the distance from the imaging device 381 to the deepest portion of the electric screen to 450 mm. In this case, the imaging result displayed in the imaging result display area 1410 is corrected so that the upper and lower ends are outward. This is because the upper end position moves upward and the lower end position moves downward as the distance from the imaging device 381 to the deepest part of the electric screen increases, as shown in the area 1520. It should be noted that the region 1520 shows the positional relationship of the imaging device 381 and the deepest portion of the electric screen viewed from the side similarly to the area 1510.

On the other hand, FIG. 16 shows a case where the distance input in step S1022 in FIG. 10B (distance from the imaging device 381 to the deepest part of the electric screen (initial value)) is 300 mm.

Here, it is assumed that the operator 1000 changes the distance from the imaging device 381 to the deepest portion of the electric screen to 250 mm. In this case, the imaging result displayed in the imaging result display area 1410 is corrected in the upper and lower ends in the inward direction. This is because if the distance from the imaging device 381 to the deepest portion of the electric screen decreases as shown in the area 1610, the upper end position moves downward and the lower end position moves upward. It is to be noted that a region 1610 shows the positional relationship of the imaging device 381 and the deepest part of the electric screen as seen from the side.

Further, it is assumed that the operator 1000 changes the distance from the imaging device 381 to the deepest portion of the electric screen to 350 mm In this case, the imaging result displayed in the imaging result display area 1410 is corrected so that the upper and lower ends are outward. When the distance from the imaging device 381 to the deepest portion of the electric screen increases, the upper end position moves upward and the lower end position moves downward, as shown in the area 1620. It should be noted that the region 1620 shows the positional relationship of the imaging device 381 and the deepest portion of the electric screen as seen from the side, similarly to the area 1610.

In FIG. 15 and FIG. 16, even when the operator 1000 changes the distance from the image pickup device 381 to the deepest portion of the electric screen, even if it is changed to the same value (350 mm in the example of FIGS. 15 and 16), the correction direction at the upper and lower ends of the imaging result is opposite. Specifically, in the example of FIG. 15, when 350 mm is input, the upper and lower edges of the imaging result are corrected inward, whereas in the example of FIG. 16, when 350 mm is input, the imaging result are corrected to the outer direction.

That is, the correction direction at the upper and lower ends with respect to the distortion of the imaging result displayed in the imaging result display area 1410 is not determined by the absolute value of the distance from the imaging device 361 to the deepest portion of the electric screen, but the relative value from the initial value.

Therefore, in one embodiment, the distortion of the imaging result is corrected by using the curvature correction strength obtained by normalizing the predetermined area with the distance (initial value) input at step S1022 in FIG. 10B as the center ("zero").

Accordingly, regardless of the distance (initial value) input in step S1022 in FIG. 10B, when it is desired to correct inward direction, the negative value (subtraction value) is input to the curvature correction intensity. When it is desired to correct it in the outward direction, it is sufficient to input a positive value (increase value) to the curvature correction strength. Further, when it is desired to increase the correction amount in the correction in the inward direction, the value close to −100 is input. When it is desired to increase the correction amount in the correction in the outside direction, it is sufficient to input the value close to 100.

As a result, the operator 1000 can easily perform adjustment work for correcting the distortion of the imaging result.

Figure 17:
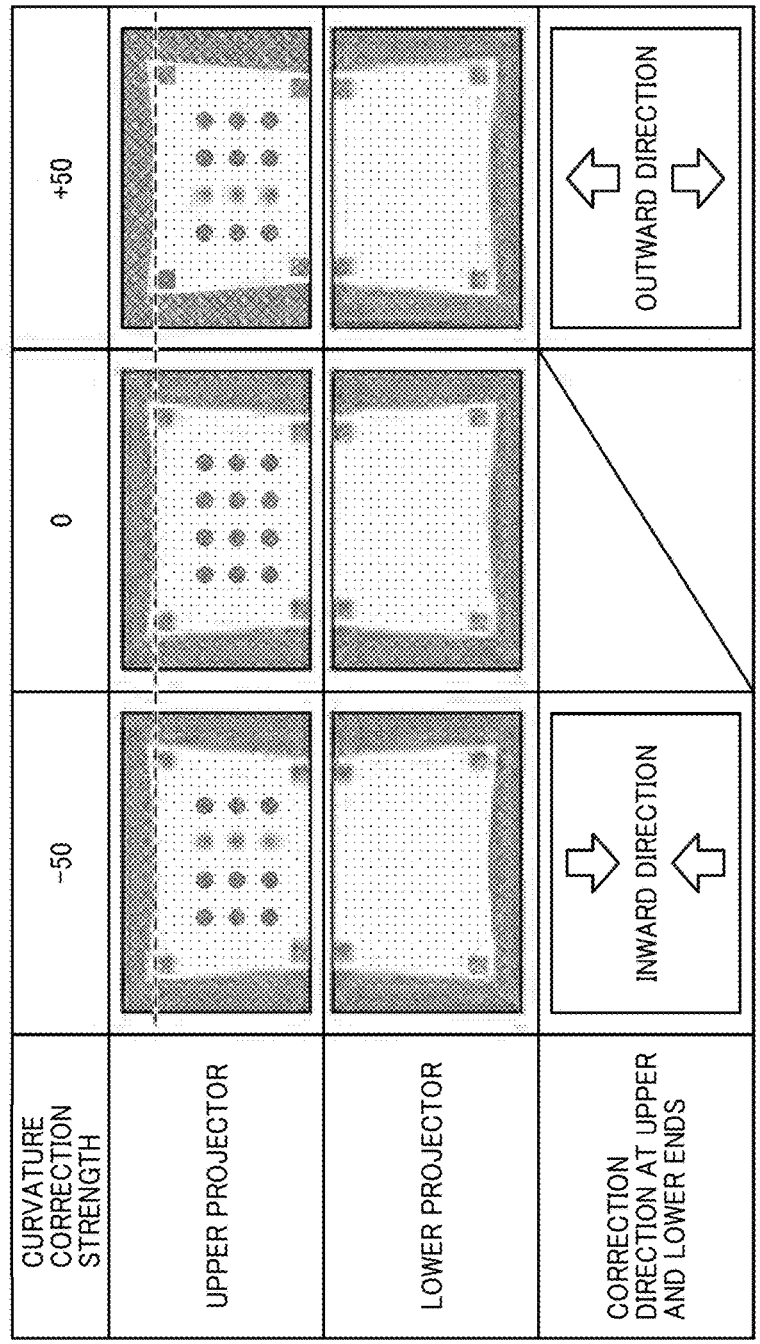
FIG. 17 illustrates a relationship between a curvature correction strength and a correction direction.

FIG. 17 is a diagram showing the relationship between the curvature correction strength and the correction direction. As shown in FIG. 17, when a negative value ("−50") is input to the curvature correction strength, the upper and lower ends of the imaging result are corrected inward. Further, when a positive value ("+50") is input to the curvature correction strength, the upper and lower ends of the imaging result are corrected to the outer direction. As described above, by using the correction direction and the curvature correction strength capable of specifying the correction amount when correcting the distortion of the imaging result, for the operator 1000, input of the distortion adjustment value for correcting the distortion of the imaging result becomes easy.

Figure 18:
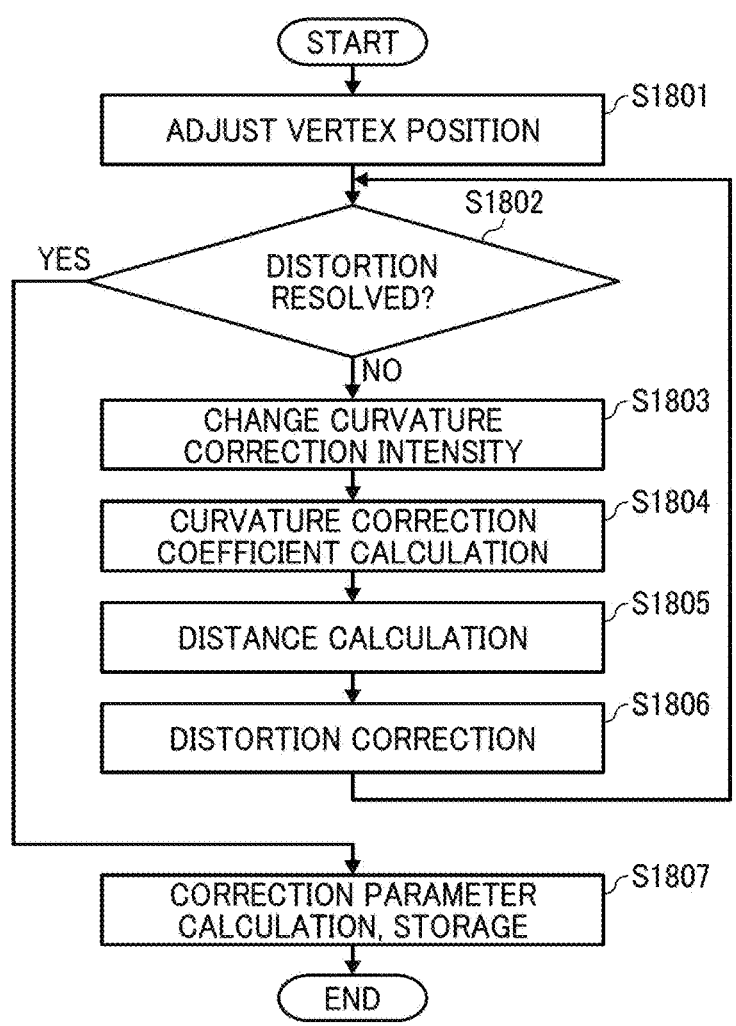
FIG. 18 illustrates a flowchart diagram including steps in a process of calculating correction parameter.

Next, the flow of the correction parameter calculation process (step S1027) will be described. FIG. 18 is a flowchart showing the flow of correction parameter calculation processing.

In step S1801, the operator 1000 adjusts the vertex position of the imaging result by inputting the position adjustment value in the adjustment fields 1420 to 1450 of the adjustment screen 1400.

In step S1802, the operator 1000 determines whether the distortion of the imaging result is resolved. In step S1802, if it is determined that the distortion is not eliminated (in the case of No in step S1802), the process proceeds to step S1803.

In step S1803, the operator 1000 changes the curvature correction strength of the curvature correction strength input field 1460 of the adjustment screen 1400. Since "0" is input as the default in the curvature correction strength input field 1460 of the adjustment screen 1400, the operator 1000 changes this.

Figure 19:
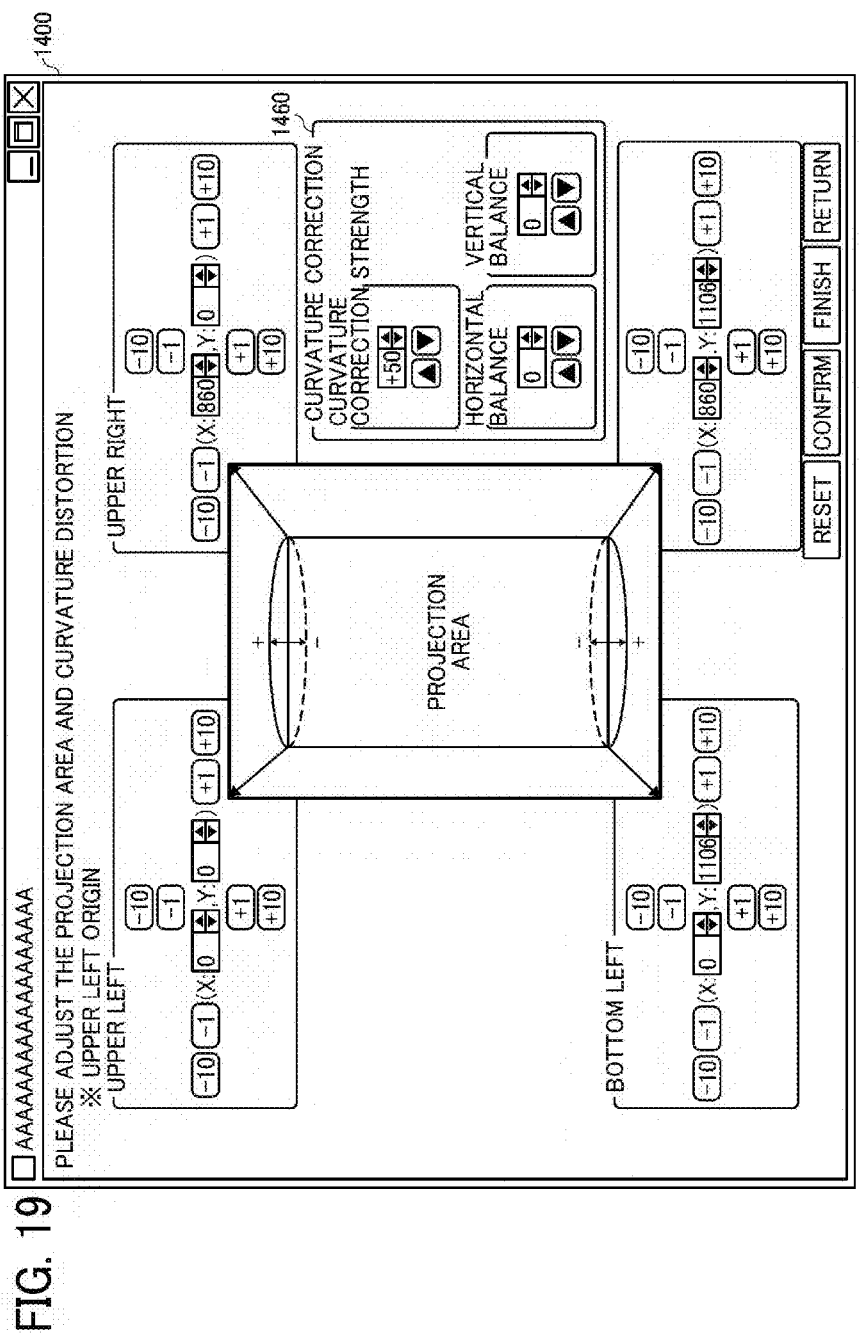
FIG. 19 illustrates an example of an adjustment screen displayed after changing a curvature correction strength.

FIG. 19 is a diagram showing an example of the adjustment screen after changing the curvature correction strength. In the example of FIG. 19, "+50" is entered in the curvature correction strength input field 1460 of the adjustment screen 1400.

In step S1804, the first calibration unit 911 calculates the curvature correction coefficients CN, CP by the following formula (1) based on the curvature correction strength x ("+50" in the example of FIG. 19) input by the operator 1000 on the adjustment screen 1400.

(1)

$$C_N = \frac{\left|\frac{D_0}{2} - D_0\right|}{100} \quad (x < 0) \quad (1\text{-}1)$$

$$C_P = \frac{|2*D_0 - D_0|}{100} \quad (x > 0) \quad (1\text{-}2)$$

In the above formula, $D_0$ is the distance (initial value) input in step S1022 of FIG. 10B.

For example, it is assumed that the distance (initial value) input in step S1022 of FIG. 10B is "400 mm". In this case, the range from 200 mm, which is ½ of the initial value, to 800 mm, which is twice the initial value, is a range in which it can be input as the curvature correction strength. That is, the minimum value "−100" of the curvature correction strength, which can be input to the curvature correction strength input field 1460 indicates "200 mm", and the maximum value "+100" of the curvature correction strength indicates "800 mm".

Under this allocation, when the curvature correction strength x="+50" is input by the operator 1000, the first calibration unit 911 calculates the curvature correction coefficient Cp=(2×400−400)/100=4.

In step S1805, the first calibrating unit 911 calculates the distance f(x) based on the following expression using the curvature correction coefficients CN and CP calculated in step S1804.

(2)

$$f(x) = \begin{cases} C_N * x + D_0 & (x < 0) \\ 0 & (x = 0) \\ C_P * x + D_0 & (x > 0) \end{cases} \quad (2)$$

In the example of FIG. 19, since the curvature correction strength x="+50" is input and the curvature correction strength Cp="4" is calculated, in the first calibration unit 911, the distance f(x)=4×50+400=600 mm is calculated.

In step S1806, the first calibration unit 911 performs image conversion processing on the imaging result displayed in the imaging result display area 1410 based on the distance f(x) calculated in step S1803, and calculates the distortion of the imaging result.

In step S1802, the operator 1000 determines whether the distortion of the imaging result has been resolved. If it is determined in step S1802 that the distortion has not been eliminated (in the case of No in step S1802), the process advances again to step S1803, and the processing from step S1803 to step S1806 is repeated.

On the other hand, when it is determined in step S1802 that the distortion is resolved (Yes in step S1802), the operator 1000 presses the completion button 1470 on the adjustment screen 1400. As a result, the first calibration unit 911 proceeds to step S1807. In step S1807, the first calibration unit 911 calculates the movement amount of each vertex position from the position adjustment value input to the adjustment columns 1420 to 1450. In addition, the first calibration unit 911 specifies the curved shape of the electric screen based on the distance calculated in step S1805. Further, the first calibration unit 911 calculates correction parameters to be used in generating the projection movie or image, based on the calculated moving amounts of the vertex positions and the curved shape of the specified electric screen.

The first calibration unit 911 stores the calculated correction parameter in the image information management unit 376. Further, the first calibration unit 911 stores the correction parameter ID (for example, "P703") and the calculated date (for example, "2016.5.25") in association with the window ID (for example. "W703") in the image information 600.

Next, the details of the second calibration process will be described with reference to the sequence diagram of FIGS. 20 and 21.

Figure 20:
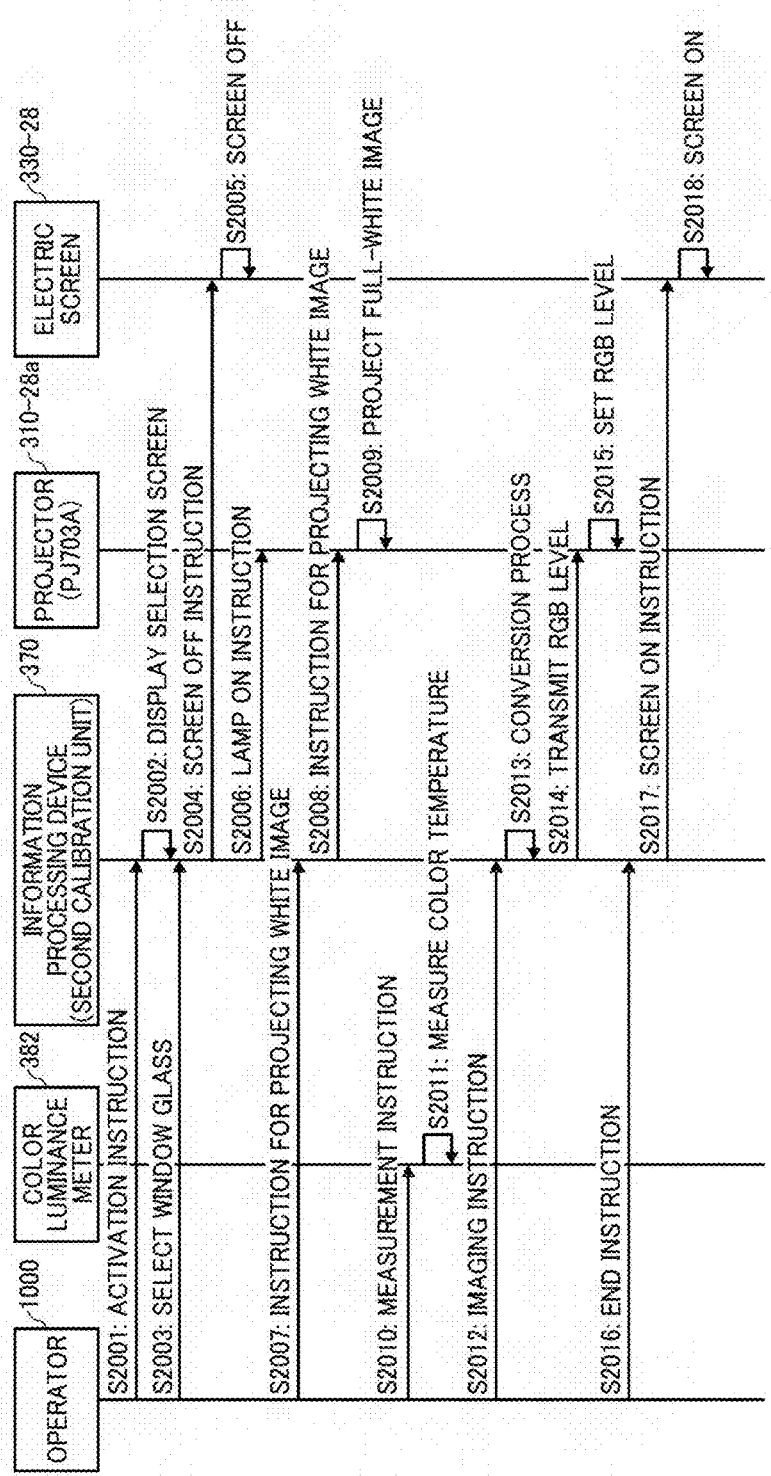
FIG. 20 illustrates a sequence diagram including steps in a second calibration process.

FIG. 20 illustrates a sequence diagram including steps in a second calibration process. As shown in FIG. 20, in step S2001, the operator 1000 inputs an activation instruction for activating the second calibration unit 912 to the information processing device 370.

In response to input of the activation instruction by the operator 1000, the second calibration unit 912 is activated in step S2002, and the display unit 405 of the information processing device 370 displays a target (projector) to be selected by the operator 1000.

In step S2003, the operator 1000 selects a window glass on which the object (projector) to be subjected to the second calibration process is arranged from among the selection screens displayed on the display unit 405.

In response to the selection of the window glass by the operator 1000, the second calibration unit 912 identifies the electric screen arranged at the position corresponding to the selected window glass. In step S2004, the second calibration unit 912 transmits a screen OFF instruction to the identified electric screen.

In the example of FIG. 20, similarly to the first calibration process, the window glass 1128 with the window ID="W703" is selected and the screen OFF instruction is transmitted to the corresponding electric screen 330-28.

In response to the transmission of the screen OFF instruction from the second calibration unit 912, the electric screen 330-28 is turned off in step S2005.

In step S2006, the second calibration unit 912 transmits a lamp ON instruction to the projector 310-28a (projector ID="PJ1703 A") arranged at a position corresponding to the window glass 1128 with the window ID="W703". As a result, the lamp of the projector 310-20a is turned on.

In step S2007, the operator 1000 inputs a projection instruction to the information processing device 370 to project the white image to the projector 310-28a.

In step S2008, the second calibration unit 912 transmits a white image projection instruction to the projector 310-28a in response to the white image projection instruction from the operator 1000.

In step S2009, the projector 310-28a performs full-white projection according to the white image projection instruction transmitted from the second calibration unit 912.

In step S2010, the operator 1000 inputs a measurement instruction to the color luminance meter 382 to measure the color temperature of the window glass performed full-whit projection by the projector 310-28a.

In step S2011, the color luminance meter 382 measures the color temperature of the window glass 1128 under full-white projection. In step S2012, the operator 1000 inputs the measured color temperature to the information processing device 370 as a measurement result.

In step S2013, the second calibration unit 912 performs conversion processing for converting the color temperature input by the operator 1000 to an RGB level.

In step S2014, the second calibration unit 912 transmits the RGB level calculated by performing the conversion process to the projector 310-28a.

In step S2015, the projector 310-28a sets the RGB level transmitted from the second calibration unit 912.

Figure 21:
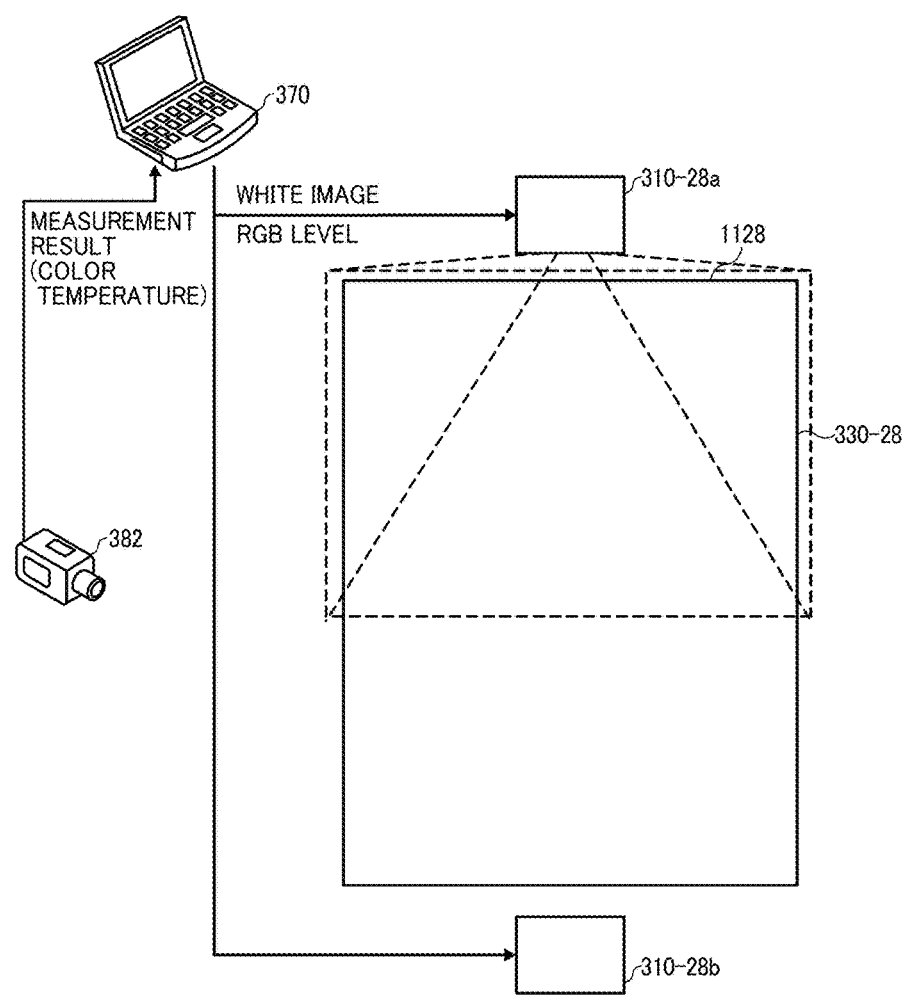
FIG. 21 illustrates an example of a white image projected during the second calibration process.

FIG. 21 illustrates an example of a white image projected during the second calibration process. As shown in FIG. 21, when the electric screen 330-28 is in the OFF state, the projector 310-28a projects the white image onto the window glass 1128. In addition, the operator 1000 measures the color temperature of the window glass 1128 using the color luminance meter 382, and inputs the measurement result to the information processing device 370. As a result, the information processing device 370 calculates the RGB level, and the ROB level corresponding to the measurement result is set in the projector 310-28a.

Returning to the description of FIG. 20. In step S2016, the operator 1000 inputs an instruction to end the second calibration process to the information processing device 370. In step S2017, the second calibration unit 912 transmits a screen ON instruction to the electric screen 330-28 in response to the input of an end instruction by the operator 1000.

In response to the transmission of the screen ON instruction from the second calibration unit 912, the electric screen 330-28 is turned on in step S2018.

Next, the details of the image processing (step S802) in the image projection system 300 will be described.

Figure 22:
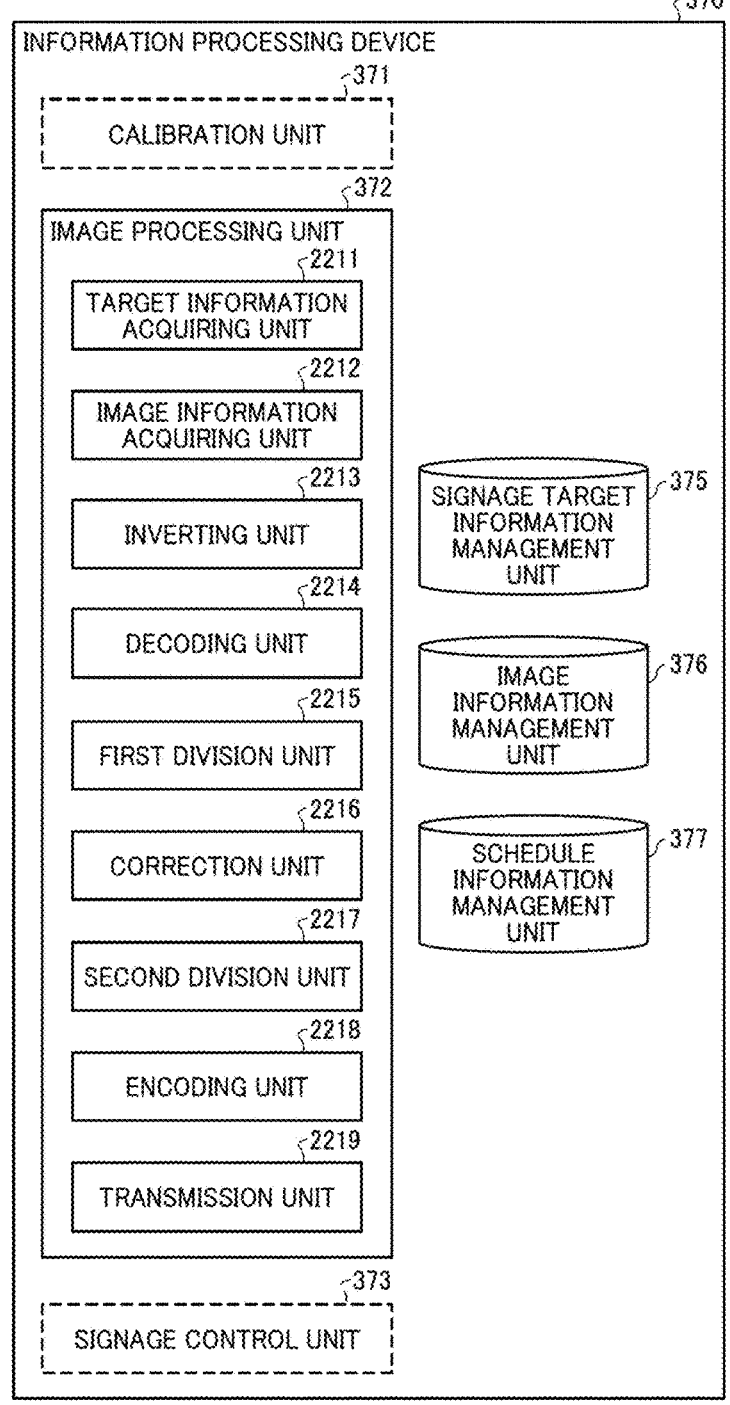
FIG. 22 illustrates an example functional configuration of the image process part of the information processing apparatus.

First, the functional configuration of the image processing unit 372 of the information processing device 370 that executes image processing will be described. FIG. 22 is a diagram showing a functional configuration of an image processing unit of the information processing apparatus.

As shown in FIG. 22, the image processing unit 372 includes a target information acquiring unit 2211, an image information acquiring unit 2212, an inverting unit 2213, and a decoding unit 2214. Further, the image processing unit 372 includes a first division unit 2215, a correction unit 2216, a second division unit 2217, an encoding unit 2218, and a transmission unit 2219.

The target information acquisition unit 2211 reads the signage target information 500 from the signage target information management unit 375 and notifies the first division unit 2215.

The image information acquiring unit 2212 reads the movie or image provided from the advertiser from the image information management unit 376, and notifies the inverting unit 2213.

The inverting unit 2213 inverts the left and right of the movie or image notified from the image information acquiring unit 2212. In the image projection system 300, a movie or image is projected from the inside of a transparent or translucent light transmitting surface (a window glass and an electric screen), and the projection result of the movie or image is visually recognized from the outside of a transparent or translucent light transmitting surface (a window glass and an electric screen). Therefore, it is necessary to invert left and right in advance. In this way, by performing the inverting process by the inverting unit 2213, it is possible to avoid a situation where a movie or image in which the left and right are inverted from the movie or image intended by the advertiser is viewed. The inverting unit 2213 notifies the decoded unit 2214 of the inverting movie or image.

The decoding unit 2214, by decoding the movie or image for which the left and right inverted and decomposing it into frame units, extracts a still image group. The decoding unit

2214 sequentially notifies the still images included in the extracted still image group to the first division unit 2215.

The first division unit 2215 performs a first division process for dividing each still image notified from the decoding unit 2214 into a plurality of still images based on the signage target information 500 notified from the target information acquisition unit 2211. As a result, the first division unit 2215 generates divided still images (divided images) according to the position of the window glass and the size of the window glass.

The first dividing unit 2215 generates, by dividing the plurality of divided still images acquired by performing the first division processing on all the still images included in the still image group for each divided still image of the same window glass, a plurality of divided still image groups corresponding to the number of window glasses. The first division unit 2215 stores the generated plurality of divided still image groups in the image information management unit 376.

In addition, the first division unit 2215 adds the divided still image group ID to each of the generated plurality of divided still image groups, and stores them in the image information 600 in association with the window ID.

Further, the first division unit 2215 notifies the correction unit 2216 in association with each of the generated plurality of divided still image groups with the window ID.

The correction unit 2216 corrects each of the plurality of divided still image groups notified from the first division unit 2215 by using correction parameters corresponding to the window ID. In addition, the correction unit 2216 notifies the second division unit 2217 of the corrected plurality of divided still image groups.

The second division unit 2217 divides each of the corrected plurality of divided still image groups notified by the correction unit 2216 into projector units. Since the plurality of corrected divided still image groups notified by the correcting unit 2216 are generated for each window glass, the second dividing unit 2217 divides the divided still image groups into projector units.

The encoding unit 2218 encodes each plurality of corrected divided still image groups divided into projector units and generate a plurality of projection movies or images for the number of projectors. The encoding unit 2218 stores the projection movie or image ID for identifying the generated plurality of projection movies or images and the generation date and time in the image information 600 in association with the projector ID.

The transmission unit 2219 transmits the plurality of projection movies or images generated by the encoding unit 2218 to the corresponding projectors. Note that by sending the projecting movie or image to the corresponding projector in advance by the transmitting unit 2219, the signage control unit 373 only has to send a projection start instruction to the projectors at the start of projection. This makes it possible to reduce the possibility of occurrence of a delay in projection of the projection movie or image, as compared with the case where the projecting movie or image is transmitted to the projector at the start of projection.

Figure 23:
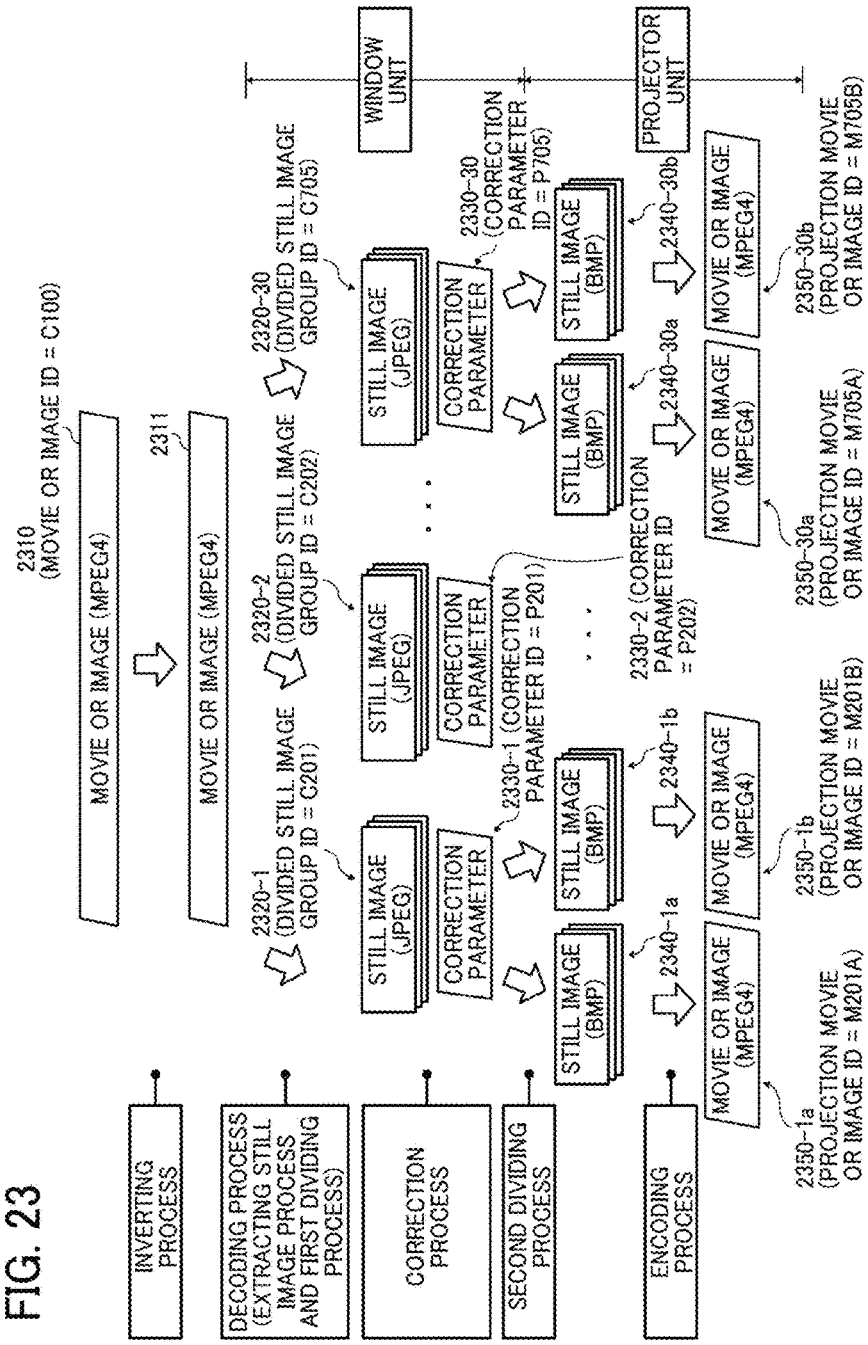
FIG. 23 illustrates an example of an operation of an image process.

Next, a specific example of image processing (step S802) by the image processing unit 372 will be described. FIG. 23 is a diagram showing a specific example of image processing.

In FIG. 23, the movie or image 2310 is a movie or image with a movie or image ID="C100" provided from the advertiser and stored in the image information managing unit 376 in the MPEG 4 format. When the image information acquiring unit 2212 reads the movie or image 2310 and notifies the inverting unit 2213, the inverting unit 2213 inverts the left and right of the movie or image 2310 and generates the inverted movie or image 2311.

The inverted movie or image 2311 is decoded by the decoding unit 2214 and extracted as a still image group including a plurality of still images. Further, for the extracted still image group, the first division unit 2215 performs a first division process based on the signage target information 500 and generates a plurality of divided still image groups.

It is to be noted that the plurality of divided still image groups (the divided still image groups 2320-1, 2320-2 . . . 2320-30) are respectively assigned to the divided still image group IDs (C201, C202 . . . C705). In addition, the plurality of divided still image groups attached the divided still image group ID is stored in the image information management unit 376. Furthermore, the divided still image group ID is stored in the image information 600 in association with the window ID.

Further, each of the plurality of divided still image groups 2320-1, 2320-2 . . . 2320-30 is corrected by the correction unit 2216 using the corresponding correction parameter. For example, the correction unit 2216 corrects the divided still image group 2320-1 by using the correction parameter 2330-1 (correction parameter ID="P201"). In addition, the correction unit 2216 corrects the divided still image group 2320-2 by using the correction parameter 2330-2 (correction parameter ID="P 202"). Further, the correcting unit 2216 corrects the divided still image group 2320-30 by using the correction parameter 2330-30 (correction parameter ID="P705").

The corrected divided still image groups 2320-1, 2320-2 . . . 2320-30 corrected by the correction parameters are divided into projector units by the second division unit 2217. For example, the corrected divided still image group 2320-1 is divided into a divided still image group 2340-1a for the projector 310-1a and a divided still image group 2340-1b for the projector 310-1b.

Similarly, the corrected divided still image group 2320-30 is divided into a divided still image group 2340-30a for the projector 310-30a and a divided still image group 1740-30b for the projector 310-30b.

The corrected divided still image groups 2340-1a to 2340-30b having been divided into projector units by the second division unit 2217 are encoded by the encoding unit 2218. As a result, the encoding unit 2218 generates a movie or image for projection in the MPEG 4 format.

For example, the encoding unit 2218 generates a projection movie or image 2350-1a by encoding the divided still image group 2340-1a for the projector 310-1a. Further, the encoding unit 2218 generates the projection movie or image 2350-1b by encoding the divided still image group 2340-1b for the projector 310-1b. Furthermore, the encoding unit 2218 generates, by encoding the divided still image group 2340-30a for the projector 310-30a and the divided still image group 2340-30b for the projector 310-30b, projection movie or images 2350-30a and 2350-30b.

The encoding unit 2218 stores, in the image information 600, the projection movie or image ID (M201A, M201B . . . M705A, M705B) for identifying the generated plurality of projection movie or images 2350-1a to 2350-30b and the generation date and time in association with the projector ID.

Further, the transmitting unit 2219 transmits the generated plurality of projection movie or images 2350-1a to 2350-30b to the corresponding projectors. For example, the transmission unit 2219 transmits the projection movie or image 2350-1*a* to the projector 310-1*a*. Also, the projection movie or image 2350-1*b* is transmitted to the projector 310-1*b*. Furthermore, the transmission unit 2219 transmits the projection movie or image 2350-30*a* to the projector 310-30*a*, the projection movie or image 2350-30*b* to the projector 310-30*b*, respectively.

Figure 24:
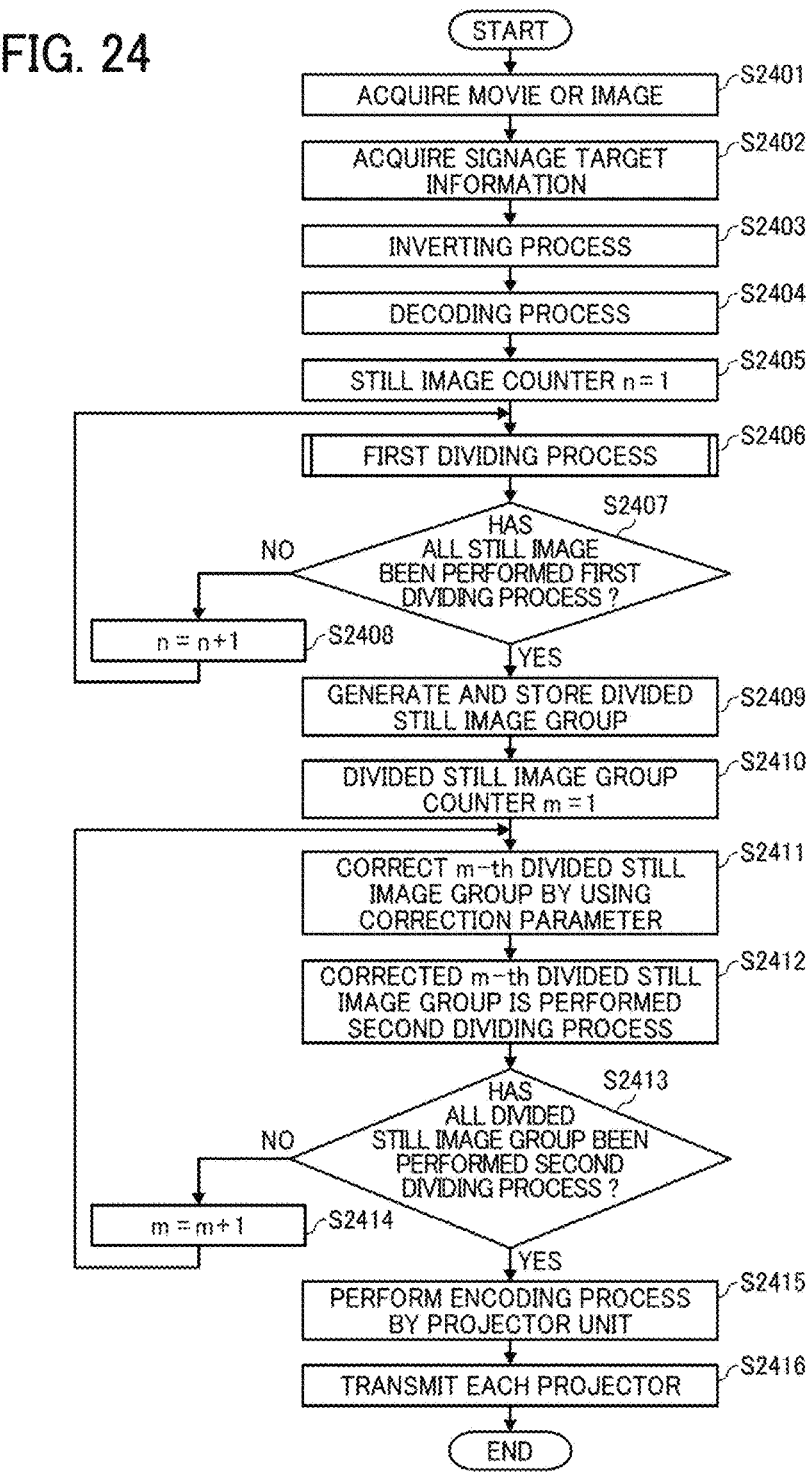
FIG. 24 illustrates a flowchart diagram including steps in the image process.

Next, the flow of image processing (step S802) will be described with reference to the flowchart of FIG. 24. FIG. 24 is a flowchart showing the flow of image processing.

In step S2401, the image information acquisition unit 2212 acquires a movie or image from the image information management unit 376. In step S2402, the target information acquisition unit 2211 acquires the signage target information 500 from the signage target information management unit 375. In step S2403, the reversing unit 2213 performs a left-right inversion process on the movie or image acquired in step S2401. In step S2404, the decoding unit 2214 extracts a still image group by decoding the inverse movie or image. In step S2405, the first division unit 2215 substitutes 1 for the still image counter n.

In step S2406, the first division unit 2215 performs a first division process on the n-th still image. The details of the flowchart of the first division process will be described later. In step S2407, the first division unit 2215 determines whether or not the first division processing is performed for each of the still images. If it is determined in step S2407 that there is a still image that is not subjected to the first division process (in the case of No in step S2407), the process proceeds to step S2408. In step S2408, the first division unit 2215 increments the still image counter n, and then returns to step S2406.

On the other hand, if it is determined in step S2407 that the first division process has been performed for each the still images, the process proceeds to step S2409.

In step S2409, the first division unit 2215, by dividing the plurality of division still images generated for each still image for each divided still image corresponding to the same window glass, generates a divided still image group for the number of window glasses and stores it in the image information management unit 376. In addition, the first division unit 2215 adds the divided still image group ID to each generated divided still image group, and stores it in the image information 600 in association with the window ID.

In step S2410, the correction unit 2216 substitutes 1 for the divided still image group counter m. In step S2411, the correction unit 2216 corrects the m-th divided still image group among the divided still image groups generated in step S2409 by using the corresponding correction parameter. In step S2412, the second division unit 2217 performs second division processing on the corrected m-th divided still>image group. In step S2413, the second division unit 2217 determines whether correction processing and second division processing are performed on each of the divided still image groups generated in step S2409.

If it is determined in step S2413 that there is a divided still image group not subjected to the correction process and the second division process (in the case of No in step S2413), the process proceeds to step S2414. In step S2414, the correction unit 2216 increments the divided still image group counter m, and the process returns to step S2411. On the other hand, if it is determined in step S2413 that the correction process and the second division process are performed for all the divided still image groups (in the case of Yes in step S2413), the process proceeds to step S2415. In step S2415, the encoding unit 2218 generates, by encoding the divided still image group subjected to the second division processing in units of the projector, a plurality of projection movie or images for the number of projectors. In addition, the encoding unit 2218 stores, in the image information 600, the generated date and time for the each generated movie or images included in the projection movie or image group for projection. In step S2416, the transmission unit 2219 transmits the generated projection movie or images included in the projection movie or image group to the corresponding projectors.

Figure 25:
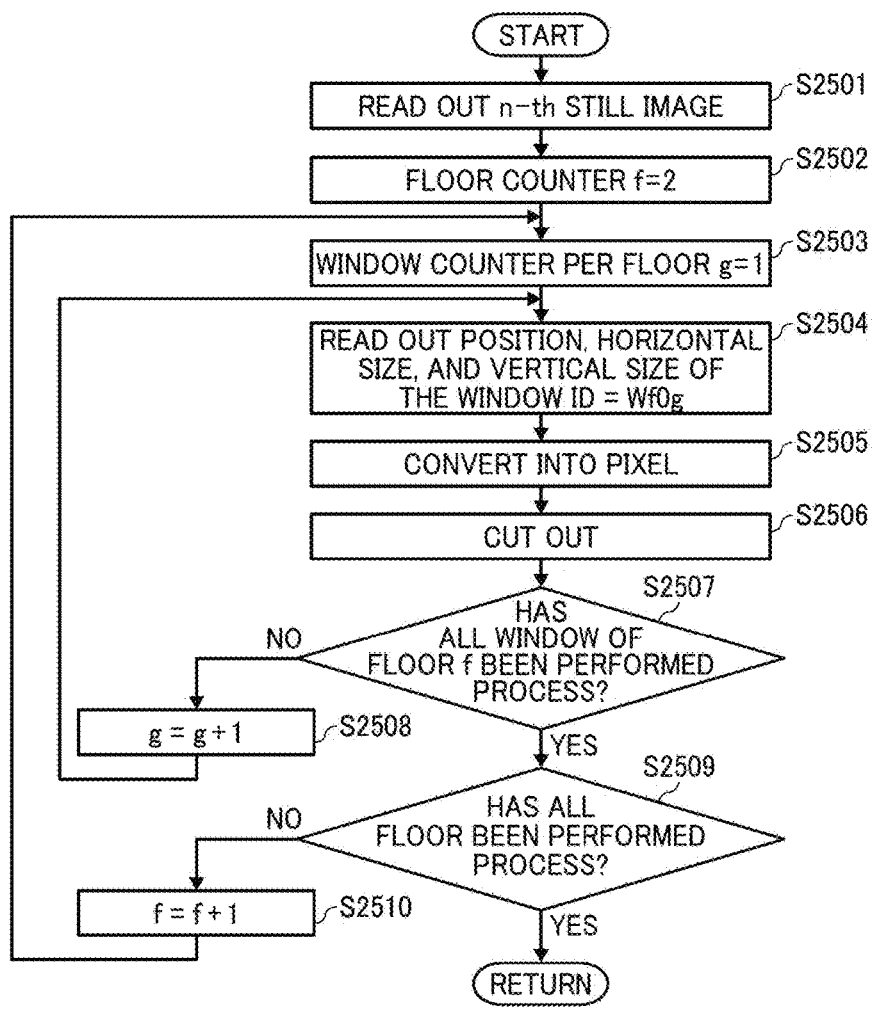
FIG. 25 illustrates a flowchart diagram including steps in a first division process.
Figure 26:
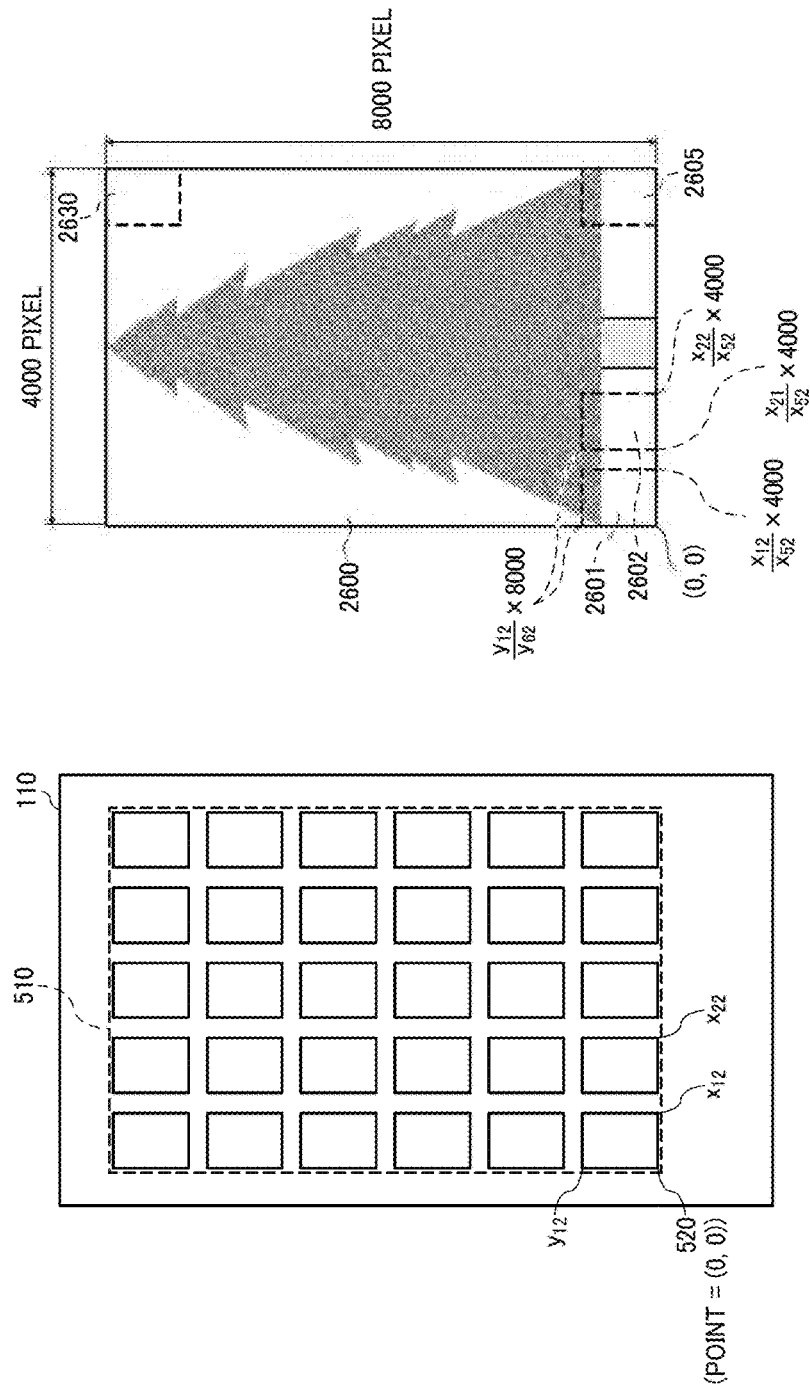
FIG. 26 illustrates an illustration for describing an example of an operation of the first division process.

Next, the details of the first division processing (step S2406) will be described with reference to FIGS. 25 and 26. FIG. 25 is a flowchart showing the flow of the first division process. FIG. 26 is a diagram showing an example of the first division process.

In step S2501, the first division unit 2215 reads out the n-th still image. In FIG. 26, it is assumed that the still image 2600 is the n-th still image read by the first division unit 2215. In step S2502, the first division unit 2215 substitutes "2" into the floor counter f. In step S2503, the first division unit 2215 substitutes "1" in the window counter g for counting the number of window glasses per floor. In step S2504, the first division unit 2215 reads the "position", the "horizontal size", and the "vertical size" of the window ID="Wf0g" from the signage target information 500. Here, since "2" is assigned to f and "1" is assigned to g, the horizontal size (x12, the vertical size (y12), and the position ((0, 0)) corresponding to the window ID="W201" are read out.

In step S2505, the first division unit 2215 converts the position, the horizontal size, and the vertical size read in step S2504 into pixels on the still image 2600 in accordance with the contrast between the still image 2600 and the predetermined area 510.

As shown in FIG. 26, in one embodiment, it is assumed that the still image 2600 is configured to have 4000 pixels in the horizontal direction and 8000 pixels in the vertical direction. In this case, the pixel on the still image 2600 corresponding to the position="(0, 0)" is in the pixel of position="(0, 0)".

Further, the pixels in the still image 2000 corresponding to the horizontal size (x12) are pixels calculated by (x12 / x52)×4000. Further, the pixels on the still image 2000 corresponding to the vertical size (y12) are pixels calculated by (y12 / y62)×8000.

In step S2506, the first division unit 2215 cuts out the rectangular area 2601 specified based on the pixel calculated in step S2505 from the still image 2600, and generates a divided still image. In step S2507, the first division unit 2215 determines whether or not the first division processing is performed for each of the window glasses on the f floor. If it is determined in step S2507 that there is a windowpane for which the first division process has not been performed (in the case of No in step S2507), the process proceeds to step S2508. In step S2508, the first dividing unit 2215 increments the window counter g, and then returns to step S2504. As a result, "2" is assigned to g.

In step S2504, the first division unit 2215 reads the horizontal size (x22 −x21), and the vertical size (y12), and the position ((x21, 0)) corresponding to the window ID="W202" from the signage target information 500. In step S2505, the first division unit 2215 converts the position, the horizontal size, and the vertical size read in step S2504 into pixels in the still image 2600.

As shown in FIG. 26, the pixel on the still image 2600 corresponding to the position ((x21, 0)) is a pixel calculated by (x21 / x52)×4000. Further, the pixels on the still image 2600 corresponding to the horizontal size (x22 −x21) are pixels calculated by (x22 /x 52))×4000. Further, the pixels on the still image 2600 corresponding to the vertical size (y12) are pixels calculated by (y12 / y62)×8000.

In step S2506, the first division unit 2215 cuts out the rectangular area 2602 specified based on the pixel calculated in step S2505 from the still image 2600, and generates a divided still image.

In step S2507, the first division unit 2215 determines whether or not the first division processing is performed for each of the window glasses on the f floor. If it is determined in step S2507 that there is a windowpane for which the first division process has not been performed (in the case of No in step S2507), the process proceeds to step S2508. Thereafter, in step S2506, the processing of steps S2504 to S2506 is repeated until the rectangular region 2605 is cut out.

In step S2507, if it is determined that the first division processing is or has been performed for each the window glasses on the f floor (in the case of Yes in step S2507), the processing proceeds to step S2509.

In step S2509, the first division unit 2215 determines whether or not the first division processing is performed for each of the floors. If it is determined in step S2509 that there is a floor not performing the first division process (in the case of No in step S2509), the process proceeds to step S2510.

In step S2510, the first dividing unit 2215 increments the floor counter f, and then returns to step S2503. Thereafter, in the floor counter f=7, the processing of steps S2504 to S2507 is repeated until the rectangular area 2630 is cut out.

If it is determined in step S2509 that the first division process is performed for each of the floors (in the case of Yes in step S2509), the process returns to step S2407 in FIG. 24.

Next, the details of the signage control process (step S803) in the image projection system 300 will be described.

Figure 27:
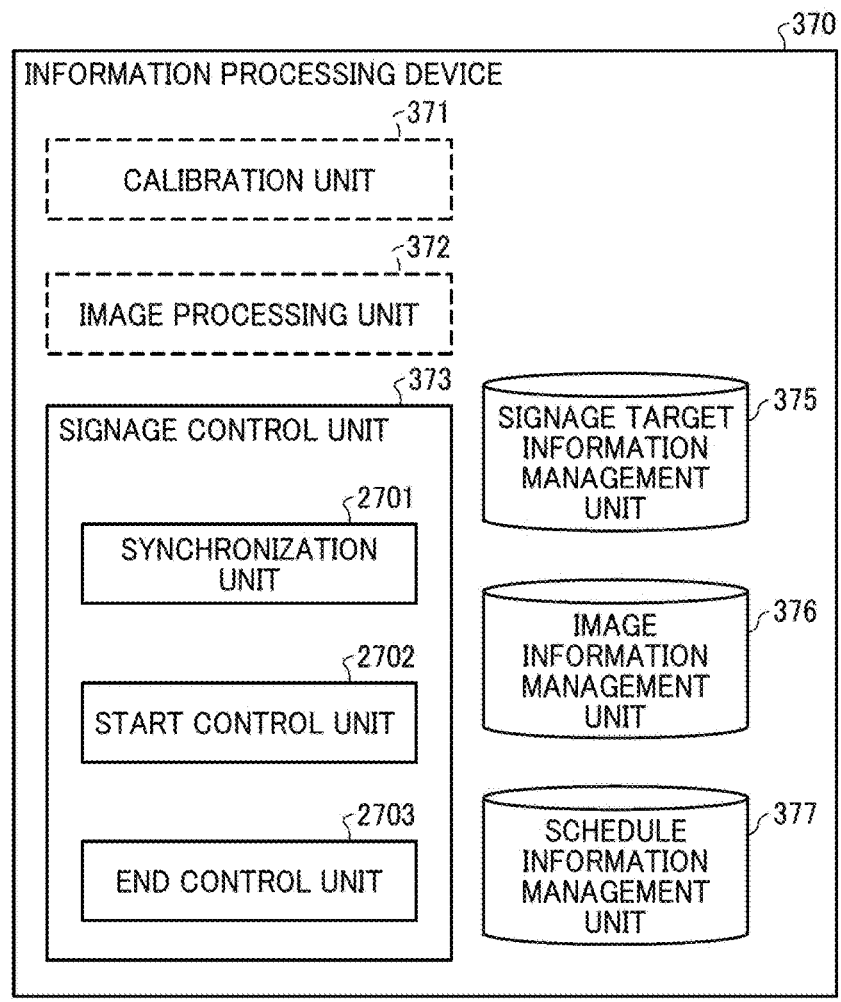
FIG. 27 illustrates a block diagram of an example functional configuration of the signage controlling part of the information processing apparatus.

First, the functional configuration of the signage control unit 373 of the information processing device 370 that executes the signage control process will be described. FIG. 27 is a diagram showing a functional configuration of a signage control unit of the information processing apparatus.

As shown in FIG. 27, the signage control unit 373 includes a synchronization unit 2701, a start control unit 2702, and an end control unit 2703.

The synchronization unit 2701 outputs the time information. Further, the synchronization unit 2701 synchronizes the time between the projectors 310-1a to 310-30b and the information processing device 370. Specifically, the synchronization unit 2701 receives the time information from the time server 360, corrects the time information to be output, and transmits the corrected time information to the projectors 310-1a to 310-30b. The projectors 310-1a to 310-30b correct, by receiving the time information from the synchronization unit 2701, the time information managed internally. As a result, the synchronization unit 2701 synchronizes the time based on accurate time information between the projectors 310-1a to 310-30b and the information processing device 370.

The start control unit 2702 reads the schedule information stored in the schedule information management unit 377 and identifies the projection start time. The start control unit 2702 transmits an instruction on the operation at the time of projection start to each signage device based on the identified projection start time.

The end control unit 2703 reads the schedule information stored in the schedule information management unit 377 and identifies the projection end time.

The end control unit 2703 transmits an instruction on the operation at the time of projection end to each signage device based on the identified projection end time.

Figure 28:
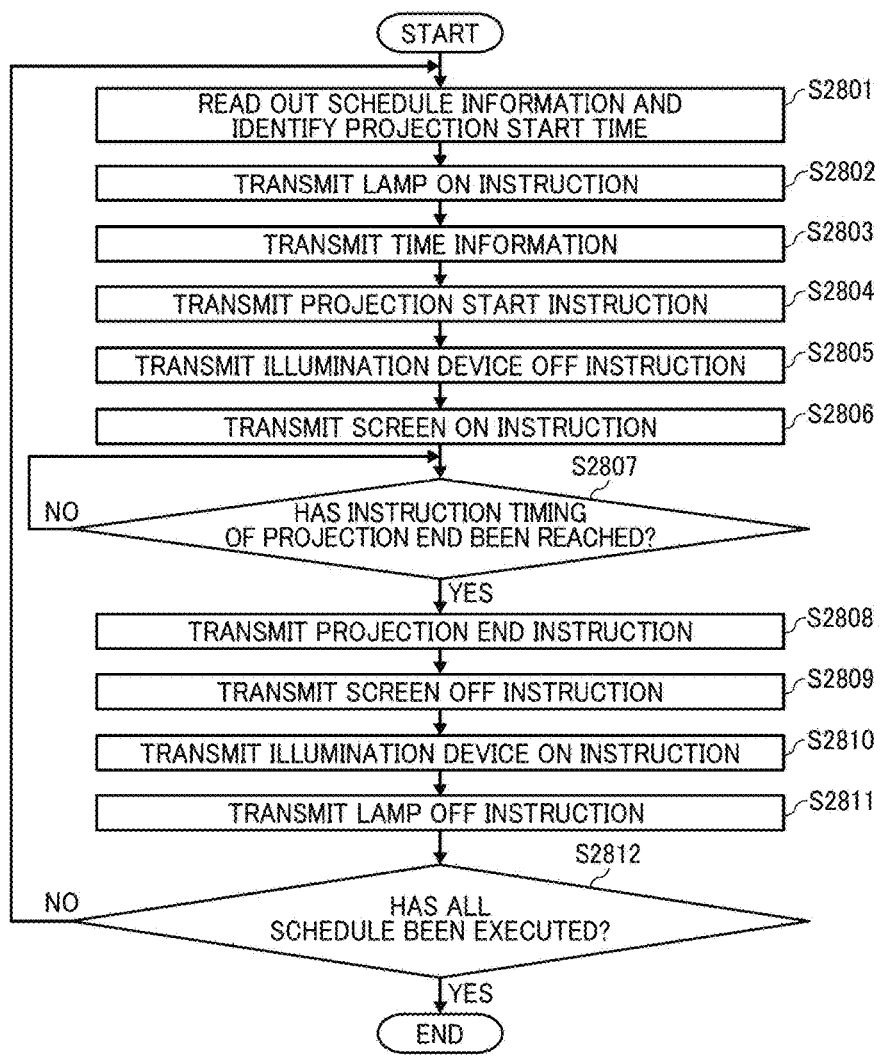
FIG. 28 illustrates a flowchart diagram including steps in a signage process.

Next, the flow of the signage control process (step S803) by the signage control unit 373 will be described. FIG. 28 is a flowchart showing the flow of signage control processing. After the image processing (step S802) by the image processing unit 372, the signage control processing shown in FIG. 28 is executed.

It is assumed that the schedule information 700 is stored in the schedule information management unit 377 at the start of the signage control process shown in FIG. 28.

In step S2801, the start control unit 2702 reads the schedule information 700 stored in the schedule information management unit 377. In addition, the start control unit 2702 identifies the projection start time based on the read schedule information 700.

In step S2802, the start control unit 2702 transmits a lamp ON instruction to the projectors 310-1a to 310-30b at a timing according to the identified projection start time. As a result, the lamps of the projectors 310-1a to 310-30b are turned on.

In step S2803, the synchronization unit 2701 receives the time information from the time server 360, corrects the time information managed in the information processing device 370, and transmits the corrected time information to the projectors 310-1a to 310-30b.

In step S2804, the start control unit 2702 transmits a projection start instruction to the projectors 310-1a to 310-30b at a timing according to the identified projection start time. Thus, in each of the projectors 310-1a to 310-30b, processing for starting the projection of the projection moving image is performed.

In step S2805, the start control unit 2702 transmits an illumination device OFF instruction to the illumination devices 140-1 to 140-6 at a timing according to the identified projection start time. As a result, the appliances 140-1 to 140-6 are turned OFF.

In step S2806, the start control unit 2702 transmits a screen ON instruction to the electric screens 330-1 to 330-30 at a timing according to the identified projection start time. As a result, each of the electric screens 330-1 to 330-30 is in the ON state, and the light transmitting surface is in a translucent state. Through the above processing, digital signage corresponding to 1 schedule information is started.

When the digital signage is started, the end control unit 2703 reads out one schedule information 700 stored in the schedule information management unit 377. Further, the end control unit 2703 identifies the projection end time based on the read schedule information 700.

In step S2807, the end control unit 2703 determines whether or not the current time reaches the identified projection end time. If it is determined in step S2807 that the projection end time has not been reached (in the case of No in step S2807), the end control unit 2703 waits until it is determined that the projection end time has been reached.

On the other hand, if it is determined in step S2807 that the projection end time has been reached (in the case of Yes in step S2807), the process proceeds to step S2808.

In step S2808, the end control unit 2703 transmits a projection end instruction to the projectors 310-1a to 310-30b at a timing according to the identified projection end time. As a result, the projectors 310-1a to 310-30b end the projection of the projection movie or images.

In step S2809, the end control unit 2703 transmits a screen OFF instruction to the electric screens 330-1 to 330-30 at a timing corresponding to the identified projection end time. As a result, each of the electric screens 330-1 to 330-30 is in the OFF state and the light transmitting surface is in the transparent state.

In step S2810, the termination control unit 2703 transmits an illumination device ON instruction to the illumination devices 140-1 to 140-6 at a timing corresponding to the identified projection start time. As a result, the illumination devices 140-1 to 140-6 are turned ON.

In step S2811, the end control unit 2703 transmits a lamp OFF instruction to the projectors 310-1a to 310-30b at a timing according to the identified projection end time. As a result, the lamps of the projectors 310-1a to 310-30b are turned off. Through the above processing, the digital signage corresponding to schedule information is ended.

When the digital signage ends, the start control unit 2702 determines whether or not all the digital signage based on the schedule information 700 stored in the schedule information management unit 377 has been executed.

In step S2812, when it is determined that schedule information for which digital signage is not yet executed exists (in the case of No in step S2812), the process returns to step S2801. On the other hand, when it is determined that the digital signage based on all the schedule information is executed (in the case of Yes in step S 2812), the signage control process is terminated.

In the above description, in the image projection system 300 according to the present disclosure, the inversion processing of the movie or image provided from the advertiser is performed. Further, the still image of each frame extracted from the movie or image on which the inversion process was performed is divided based on the position and the size of the plurality of window glasses included in the predetermined area on the outer surface of the building and a plurality of divided still images is generated from each still image. The divided still image group corresponding to the number of window glasses is generated by using divided still images of each frame corresponding to the same window glass and stored in the image information management section. Calibration processing is performed on projectors arranged at positions corresponding to a plurality of window glasses included in a predetermined area on the outer surface of the building, and the divided still image groups are corrected by using the correction parameters generated on the basis of the result of the calibration processing. The split still image group corrected is divided according to the number of projectors arranged at positions corresponding to one window glass and encoded, thereby generating a projection movie or image group for each projector. Projection movie or images of the generated projection movie or image group is projected on the electric screens corresponding to each of the plurality of window glasses via the corresponding projectors.

This makes it possible to realize a digital signage combining a plurality of light transmitting surfaces.

Further, in the image projection system 300 according to the present disclosure, the imaging result of the calibration pattern image acquired in the calibration process is displayed on the adjustment screen, and the input of the position adjustment value for adjusting each vertex position of the imaging result is accepted. Also, as the value for correcting the distortion of the imaging result accompanying the curved shape of the electric screen, the input of the distortion adjustment value (curvature correction strength) obtained by normalizing the distance from the imaging device to the deepest portion of the electric screen is accepted. A correction parameter for correcting the projection movie or image is calculated based on the movement amount of the vertex position calculated based on the position adjustment value and the curved shape specified based on the curvature correction intensity.

In this way, when correcting the distortion of the imaging result accompanying the curved shape of the electric screen, by inputting the normalized value, according to the image projection system 300 according to the present disclosure, it is possible to easily carry out the adjustment work for correcting the distortion.

In the first embodiment, the range from ½ the initial value to twice the initial value is assigned as −100 to 100 as the range in which the curvature correction intensity can be entered. However, the input possible range is not limited to this.

Further, in the first embodiment, the case where the window glass is curved from the inside to the outside has been described, but also in the case where the window glass is curved from the outside to the inside, similarly, the curvature correction strength can be used.

Further, in one embodiment, the information processing device 370 is described as having the calibration unit 371, the image processing unit 372, and the signage control unit 373, but some of these functions can be performed by another signage device.

Further, in one embodiment, the window glass attached to the predetermined area on the outer surface of the building 110 is described as the projection target, but the projection target is not limited to the window glass, and can be another light transmitting surface. The light transmitting surface is not limited to the one attached to a predetermined area on the outer surface of the building 110. The light transmitting surface can be attached to a predetermined region inside the building 110, or attached to another building than the building 110.

In the first embodiment, the signage device is described as a projector (projection device), an electric screen, and an illumination device, but the signage device is not limited thereto. For example, a lighting device inside the building 110, an illumination device that illuminates a wall surface or a signboard etc. of the building 110 from the outside of the building 110, an object installed in the building 110, a signboard, etc., already installed in the building 110, it may be included in the signage device.

It is to be noted that the present application is not limited to the configurations described in the above embodiments, such as combinations with other elements, and the like. With respect to these points, it is possible to change within the scope not deviating from the gist of the present disclosure, and it can be appropriately determined according to the application form.

The invention claimed is:

1. An image projection system, comprising: a plurality of surfaces in a projection region, each surface having an electric screen, for each surface of the plurality of surfaces, a plurality of projector sets including an upper projector and a lower projector so that each surface has different corresponding upper and lower projectors: and processing circuitry configured to receive, for each surface of the plurality of surfaces in the projection region, an adjustment value to increase or decrease an effective distance from an imaging device to a curved position of the surface;

determine, for each surface of the plurality of surfaces, a curved shape of the surface in accordance with a change of distortion corresponding to the effective distance that was increased or decreased by the received adjustment value;

calculate, for each surface of the plurality of surfaces, correction parameters to correct the distortion of projection images projected onto the surface, in accordance with the determined curved shape of the surface;

divide an image into a plurality of divided images in accordance with positions and sizes of the each surface of the plurality of surfaces in the projection region; and control the plurality of projector sets to respectively project the plurality of divided images onto the plurality of surfaces, each projector set of the plurality of projector sets corresponding to a different projection surface of the plurality of surfaces and projecting a corresponding divided image of the plurality of divided images onto the different projection surface using the corresponding correction parameters for the surface.

2. The image projection system of claim 1, wherein the processing circuitry is further configured to receive, for each surface of the plurality of surfaces, the adjustment value, which is a normalized value within a range determined by a distance input by an operator.

3. The image projection system of claim 1, wherein the processing circuitry is further configured to:

display, for each surface of the plurality of surfaces, a captured image obtained by capturing a calibration image projected on the surface, and display, for the surface, a change of the distortion corresponding to the effective distance that was increased or decreased by the received adjustment value for the surface.

4. The image projection system of claim 3, wherein the processing circuitry is further configured to:

convert the captured image for changing the distortion of the captured image in an outward direction when the effective distance is increased based on the received adjustment value for the surface; and convert the captured image for changing the distortion of the captured image in an inward direction when the effective distance is decreased based on the received adjustment value for the surface.

5. An image projecting method for projecting onto a plurality of surfaces in a projection region, each surface having an electric screen in a projection system including, for each surface of the plurality of surfaces, a plurality of projector sets including an upper projector and a lower projector so that each surface has different corresponding upper and lower projectors, the method comprising:

receiving, for each surface of the plurality of surfaces in the projection region, an adjustment value to increase or decrease an effective distance from an imaging device to a curved position of the surface;

determining, for each surface of the plurality of surfaces, a curved shape of the surface in accordance with a change of distortion corresponding to the effective distance that was increased or decreased by the received adjustment value;

calculating, for each surface of the plurality of surfaces, correction parameters to correct the distortion of projection images projected onto the surface, in accordance with the determined curved shape of the surface;

dividing an image into a plurality of divided images in accordance with positions and sizes of the each surface of the plurality of surfaces in the projection region; and controlling the plurality of projector sets to respectively project the plurality of divided images onto the plurality of surfaces, each projector set of the plurality of projector sets corresponding to a different projection surface of the plurality of surfaces and projecting a corresponding divided image of the plurality of divided images onto the different projection surface using the corresponding correction parameters for the surface.

6. A non-transitory computer readable medium storing computer executable instructions which, when executed by processing circuitry, causes the processing circuitry to execute a projection method for projecting onto a plurality of surfaces in a projection region, each surface having an electric screen in a projection system including, for each surface of the plurality of surfaces, a plurality of projector sets including an upper projector and a lower projector so that each surface has different corresponding upper and lower projectors, the method including:

receiving, for each surface of the plurality of surfaces in the projection region, an adjustment value to increase or decrease an effective distance from an imaging device to a curved position of the surface;

determining, for each surface of the plurality of surfaces, a curved shape of the surface in accordance with a change of distortion corresponding to the effective distance that was increased or decreased by the received adjustment value;

calculating, for each surface of the plurality of surfaces, correction parameters to correct the distortion of projection images projected onto the surface, in accordance with the determined curved shape of the surface;

dividing an image into a plurality of divided images in accordance with positions and sizes of the each surface of the plurality of surfaces in the projection region; and controlling the plurality of projector sets to respectively project the plurality of divided images onto the plurality of surfaces, each projector set of the plurality of projector sets corresponding to a different projection surface of the plurality of surfaces and projecting a corresponding divided image of the plurality of divided images onto the different projection surface using the corresponding correction parameters for the surface.

7. The image projection system of claim 1, wherein the processing circuitry is further configured to calculate, for each projector in each projector set of the plurality of projector sets, an RGB level for the projector.

* * * * *